United States Patent
Isu et al.

(10) Patent No.: US 6,697,433 B1
(45) Date of Patent: Feb. 24, 2004

(54) IMAGE DECODING APPARATUS

(75) Inventors: Yoshimi Isu, Tokyo (JP); Shunichi Sekiguchi, Tokyo (JP); Kohtaro Asai, Tokyo (JP); Fuminobu Ogawa, Tokyo (JP); Shinichi Kuroda, Tokyo (JP); Hirofumi Nishikawa, Tokyo (JP); Yoshihisa Yamada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/601,404

(22) PCT Filed: Oct. 21, 1999

(86) PCT No.: PCT/JP99/05820

§ 371 (c)(1),
(2), (4) Date: Aug. 1, 2000

(87) PCT Pub. No.: WO00/25523

PCT Pub. Date: May 4, 2000

(30) Foreign Application Priority Data

Oct. 23, 1998 (JP) ............................................. 10/303040

(51) Int. Cl.⁷ ................................................ H04B 1/66
(52) U.S. Cl. ................................................ 375/240.27
(58) Field of Search ............................. 375/240, 240.01, 375/240.08, 240.09, 240.11, 240.12, 240.13, 240.14, 240.15, 240.16, 240.22, 240.23, 240.25, 240.26, 240.27; 348/384.1, 407.1, 411.1, 415.1, 416.1; 382/232, 236, 240; H04B 1/66

(56) References Cited

U.S. PATENT DOCUMENTS 5,471,252 A * 11/1995 Iu ............................ 348/413.1
5,481,627 A * 1/1996 Kim ............................ 382/254
5,751,361 A * 5/1998 Kim ............................ 348/409.1
5,912,707 A * 6/1999 Kim ............................ 348/415.1
6,333,949 B1 * 12/2001 Nakagawa et al. ..... 375/240.16
2003/0012286 A1 * 1/2003 Ishtiaq et al. ........... 375/240.27

FOREIGN PATENT DOCUMENTS

| JP | A346482 | 2/1991 |
|---|---|---|
| JP | A4180381 | 6/1992 |
| JP | 6-217150 A | 8/1994 |
| JP | A7154783 | 6/1995 |
| JP | A879752 | 3/1996 |
| JP | A8251422 | 9/1996 |
| JP | A927955 | 1/1997 |
| JP | A9116905 | 5/1997 |
| JP | A1023431 | 1/1998 |

* cited by examiner

Primary Examiner—Chris Kelley
Assistant Examiner—Tung Vo
(74) Attorney, Agent, or Firm—Birch, Stewart, Kolasch & Birch, LLP

(57) ABSTRACT

A lateral directional difference calculating unit 21 calculates a change degree between pixel levels of pixels adjacent to each other through a boundary of a decoded block and a block adjacent to the decoded block in a lateral direction and calculates a change degree between pixel levels of pixels placed in the block adjacent to the decoded block in the lateral direction, a lateral directional continuity judging unit 23 judges the continuity between the decoded block and the block adjacent to the decoded block in the lateral direction. A longitudinal directional difference calculating unit 22 and a longitudinal directional continuity judging unit 24 are operated in the same manner, a block continuity judging unit 25 judges the continuity between the decoded block and each block adjacent to the decoded block, and an error macro-block judging unit 26 detects an error macro-block according to a judging result of the block continuity judging unit 25.

14 Claims, 17 Drawing Sheets

FIG.10
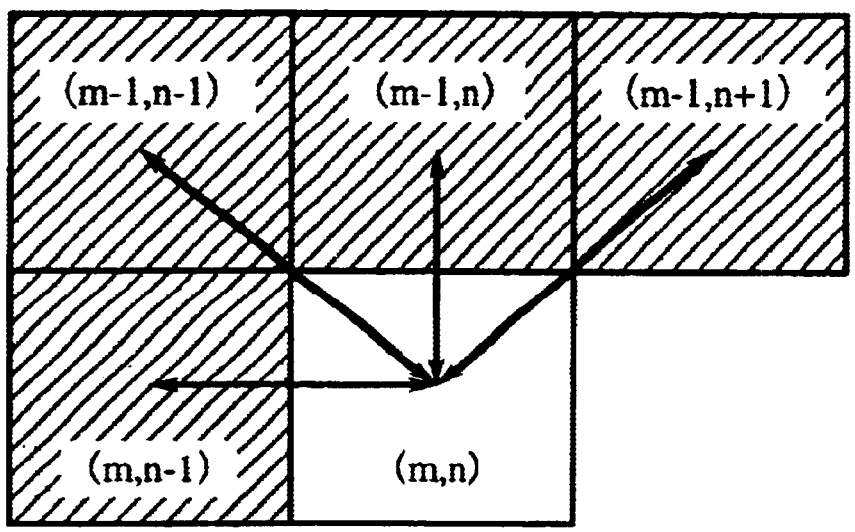
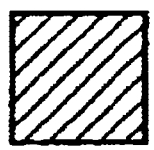 NEIGHBORING BLOCK
 DIFFERENCE BETWEEN PIXEL LEVEL AVERAGES IN BLOCKS

IMAGE DECODING APPARATUS This application is the national phase under 35 U.S.C. §371 of PCT International Application No. PCT/JP99/05820 which has an International filing date of Oct. 21, 1999, which designated the United States of America.

BACKGROUND OF THE INVENTION

1. Field of the Invention

The present invention relates to an image decoding apparatus in which an error partial image region, which receives the influence of a bit error occurring in a coded bit stream, is detected in each of various types of image compressing and expanding methods.

2. Description of Related Art

As a method for effectively coding an image signal, as is adopted in MPEG-4 (Moving Picture Experts Group Phase-4) which is currently in progress toward standardization by ISO/IEC JTC11/SC29/WG11, a method, in which a discrete cosine transformation (DCT) is performed for an image signal for each block and a variable-length coding is performed for quantization-transformation coefficients obtained after a quantization of the image signal, is used.

As is described above, on a decoding side, after a variable-length decoding is performed for a coded bit stream for each block of data, an inverse quantization and an inverse DCT are performed for the coded bit stream, and the coded bit stream is reproduced as the image signal. In this decoding, there is a case that a bit error occurs in a variable-length code-word existing in a block data region. For example, in cases where the variable-length code-word, in which the bit error occurs, has a value defined in a predetermined variable-length decoding table, because the variable-length code-word is decoded without detecting the bit error, an erred image signal is reproduced.

Also, because data of each block has a variable-length, an end of data of the block cannot be specified until the data of the block is decoded. In cases where a variable-length code-word is erroneously decoded, there is a high possibility that the end of the data of the block is also erroneously specified, so that pieces of data of blocks placed after this block are erroneously decoded. In this case, the degradation of an image quality caused by the error is propagated to data of succeeded blocks.

Because a conventional image decoding apparatus has a configuration described above, for example, in cases where a bit error occurs in a block data region, because the decoding of coded data is continued until a value not defined in a variable-length decoding table is detected in the decoding, an image, which is obtained by erroneously decoding pieces of data placed in a range from an error occurring position to an error detected position, is considerably degraded. Also, because the degraded image is used as a predicted image in the decoding for obtaining one or more images of frames succeeding the frame of the degraded image, there is a problem that the decoded images of the succeeded frames are also degraded.

As a prior art relating to the above problem, there is a prior art disclosed in the Published Unexamined Japanese Patent Application No. H7-154783 (1995). In this specification, when pieces of coded data of a particular block having a prescribed size are decoded, a change degree between each peripheral pixel of the particular block and each peripheral pixel of a block adjacent to the particular block is calculated, and an error is detected by comparing the change degree with a prescribed critical value. However, there is a case that it is difficult to reliably detect the error according to only the change degree between each peripheral pixel of the particular block and each peripheral pixel of the adjacent block.

SUMMARY OF THE INVENTION

The present invention is provided to solve the above problem, and an object of the present invention is to obtain an image decoding apparatus in which a block relating to an error occurrence is reliably detected according to a statistical performance to suppress the degradation of an image quality or the propagation of the error caused by the error occurrence to the minimum degree.

An image decoding apparatus of the present invention, in which a coded bit stream produced by compressing and coding an input image signal for each partial image region is decoded, comprises partial image region data decoding means for decoding the coded bit stream for each partial image region, and error partial image region detecting means for calculating a first pixel level change degree between pixels adjacent to each other through a boundary between a decoded partial image region decoded by the partial image region data decoding means and a partial image region adjacent to the decoded partial image region, calculating a second pixel level change degree between pixels of the partial image region adjacent to the decoded partial image region, and detecting according to the first pixel level change degree, the second pixel level change degree and a prescribed threshold value relating to the first pixel level change degree and the second pixel level change degree that the decoded partial image region is an error partial image region in which an influence of a bit error occurring in the coded bit stream is received.

Therefore, the error occurrence is reliably detected in an early stage, so that an error propagation or the degradation of an image quality caused by the error can be suppressed to the minimum degree.

In an image decoding apparatus of the present invention, the error partial image region detecting means calculates a first pixel level difference value between pixels adjacent to each other through the boundary between the decoded partial image region and the partial image region adjacent to the decoded partial image region, calculates a second pixel level difference value between pixels of the partial image region adjacent to the decoded partial image region, calculates a third pixel level difference value between pixels of the partial image region adjacent to the decoded partial image region, and detects the error partial image region according to a difference value between the first pixel level difference value and the second pixel level difference value, a difference value between the second pixel level difference value and the third pixel level difference value and the prescribed threshold value.

Therefore, the error occurrence is reliably detected in an early stage, so that an error propagation or the degradation of an image quality caused by the error can be suppressed to the minimum degree.

In an image decoding apparatus of the present invention, the error partial image region detecting means comprises threshold value control means for controlling the prescribed threshold value used for the detection of the error partial image region according to a quantization step size decoded from the coded bit stream.

Therefore, an erroneous judgment for a macro-block, in which an error occurs, can be avoided.

An image decoding apparatus of the present invention, in which a coded bit stream produced by compressing and coding an input image signal for each partial image region is decoded, comprises partial image region data decoding means for decoding the coded bit stream for each partial image region, and error partial image region detecting means for calculating a representative value of a plurality of first pixel levels in a decoded partial image region decoded by the partial image region data decoding means, calculating a representative value of a plurality of second pixel levels in a partial image region placed in the neighborhood of the decoded partial image region, and detecting according to the representative value of the first pixel levels, the representative value of the second pixel levels and a prescribed threshold value relating to the representative value of the first pixel levels and the representative value of the second pixel levels that the decoded partial image region is an error partial image region in which an influence of a bit error occurring in the coded bit stream is received.

Therefore, the error occurrence is reliably detected in an early stage, so that an error propagation or the degradation of an image quality caused by the error can be suppressed to the minimum degree.

In an image decoding apparatus of the present invention, the error partial image region detecting means calculates an average of the first pixel levels as the representative value of the first pixel levels, calculates a plurality of averages of a plurality of groups of second pixel levels as a plurality of representative values of the plurality of groups of second pixel levels in a plurality of partial image regions placed in the neighborhood of the decoded partial image region, and detects the error partial image region according to a difference between the average of the first pixel levels and the average of each group of second pixel levels and a prescribed threshold value relating to the differences.

Therefore, the error occurrence is reliably detected in an early stage, so that an error propagation or the degradation of an image quality caused by the error can be suppressed to the minimum degree.

In an image decoding apparatus of the present invention, the error partial image region detecting means weights the difference between the average of the first pixel levels and the average of each group of second pixel levels according to a correlation between the decoded partial image region and the corresponding partial image region placed in the neighborhood of the decoded partial image region.

Therefore, the error occurrence can be more reliably detected by considering the correlation with the partial image region placed in the neighborhood of the decoded partial image region.

An image decoding apparatus of the present invention, in which a coded bit stream produced by compressing and coding an input image signal for each partial image region is decoded, comprises partial image region data decoding means for decoding the coded bit stream for each partial image region, and error partial image region detecting means for calculating a first pixel level change degree between pixels adjacent to each other through a boundary between a decoded partial image region decoded by the partial image region data decoding means and a partial image region adjacent to the decoded partial image region, calculating a second pixel level change degree between pixels of the partial image region adjacent to the decoded partial image region, judging continuity between the decoded partial image region and the partial image region adjacent to the decoded partial image region according to the first pixel level change degree, the second pixel level change degree and a first prescribed threshold value relating to the first pixel level change degree and the second pixel level change degree, calculating a representative value of a plurality of first pixel levels in the decoded partial image region, calculating a representative value of a plurality of second pixel levels in the partial image region placed in the neighborhood of the decoded partial image region, and detecting according to the judgment of the continuity between the decoded partial image region and the partial image region adjacent to the decoded partial image region, the representative value of the first pixel levels, the representative value of the second pixel levels and a second prescribed threshold value relating to the representative value of the first pixel levels and the representative value of the second pixel levels that the decoded partial image region is an error partial image region in which an influence of a bit error occurring in the coded bit stream is received.

Therefore, the error occurrence can be more reliably detected, and the error judgment can be avoided.

In an image decoding apparatus of the present invention, the error partial image region detecting means comprises threshold value control means for controlling the first prescribed threshold value and the second prescribed threshold value used for the detection of the error partial image region according to a quantization step size decoded from the coded bit stream.

Therefore, an erroneous judgment for a macro-block, in which an error occurs, can be avoided.

An image decoding apparatus of the present invention, in which a coded bit stream produced by compressing and coding an input image signal for each partial image region is decoded, comprises partial image region data decoding means for decoding the coded bit stream for each partial image region, and error partial image region detecting. means for detecting according to a comparison between a decoded image signal decoded by the partial image region data decoding means and a predicted error signal that the decoded partial image region is an error partial image region in which an influence of a bit error occurring in the coded bit stream is received.

Therefore, the detection of an error macro-block can be performed by using a correlation of the image signal in the time direction, an error can be detected in an early stage, and an error propagation or the degradation of an image quality caused by the error can be suppressed to the minimum degree.

In an image decoding apparatus of the present invention, the error partial image region detecting means calculates a representative value of the decoded image signal and a representative value of the predicted error signal and detects according to the representative value of the decoded image signal, the representative value of the predicted error signal and a prescribed threshold value relating to the representative value of the decoded image signal and the representative value of the predicted error signal that the decoded partial image region is the error partial image region.

Therefore, the detection of an error macro-block can be performed by using a correlation of the image signal in the time direction, an error can be detected in an early stage, and an error propagation or the degradation of an image quality caused by the error can be suppressed to the minimum degree.

An image decoding apparatus of the present invention, in which a media packet string including a coded bit stream produced by compressing and coding an input image signal for each partial image region is received and the coded bit stream is decoded, comprises partial image region data decoding means for decoding the coded bit stream for each partial image region, error partial image region detecting means for detecting according to a comparison between an image signal characteristic at a decoded partial image region decoded by the partial image region data decoding means and an image signal characteristic at one partial image region placed in the neighborhood of the decoded partial image region that the decoded partial image region is an error partial image region in which an influence of a bit error occurring in the coded bit stream is received, for each partial image region, and supervising means for supervising a bit error occurrence frequency in the reception of the media packet string according to an error detecting code included in the media packet string, wherein the error partial image region detecting means is controlled according to a supervising result of the supervising means.

Therefore, in cases where the receiving conditions are good, the erroneous detection performed in the error partial image region detecting means can be avoided, a decoding operation stable as a whole can be performed.

In an image decoding apparatus of the present invention, the error partial image region detecting means controls, according to the supervising result of the supervising means, a comparison condition used in the comparison between the image signal characteristic at the decoded partial image region and the image signal characteristic at the partial image region placed in the neighborhood of the decoded partial image region.

Therefore, in cases where the receiving conditions are good, the erroneous detection performed in the error partial image region detecting means can be avoided, a decoding operation stable as a whole can be performed.

In an image decoding apparatus of the present invention, the error partial image region detecting means controls, according to the supervising result of the supervising means, a size of each partial image region in the detection of the error partial image region.

Therefore, in cases where the receiving conditions are good, the erroneous detection performed in the error partial image region detecting means can be avoided, a decoding operation stable as a whole can be performed.

Accordingly, in the image decoding apparatus of the present invention, a macro-block, in which an error occurs, is detected, and the error is detected in an early stage in process of the image decoding. Therefore, as an industrial applicability of the present invention, the image decoding apparatus is appropriate to suppress an error propagation or the degradation of an image quality caused by the error to the minimum degree.

BRIEF DESCRIPTION OF THE DRAWINGS

FIG. 10 is a diagram showing a plurality of neighboring blocks, for which a difference calculation is performed, according to the third embodiment of the present invention;

DETAILED DESCRIPTION OF THE PREFERRED EMBODIMENTS

The invention will now be described with reference to the accompanying drawings.

Embodiment 1

In this embodiment of the present invention, when an error occurs in a block data region of a coded bit stream, a block decoded without detecting the error is detected on the basis of the continuity of an image signal at an area neighboring on a block boundary.

Figure 1:
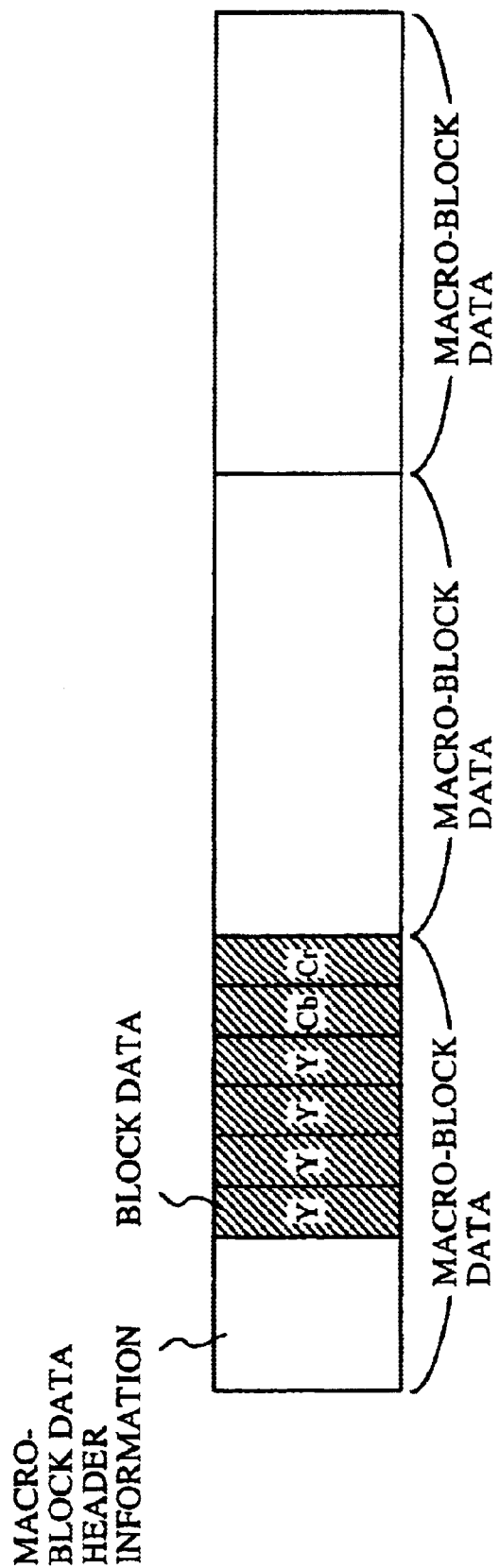
FIG. 1 is a diagram showing the structure of a texture data region of a coded bit stream of an MPEG-4 simple profile.

FIG. 1 is a diagram showing the structure of a texture data region of a coded bit stream of an MPEG-4 simple profile. In the MPEG-4, texture data of an object to be coded is coded for each of blocks which each are composed of luminance components of a 16*16 pixel size (called a "macro-block") and two types of color difference components of an 8*8 pixel size. The group of luminance components of the 16*16 pixel size is divided into a plurality of blocks respectively having the 8*8pixel size, and DCT and quantization for the texture data are performed for each block of the 8*8 pixel size. In this specification, each block of the 8*8 pixel size in the "macro-block" is specifically called a "block" hereinafter.

As shown in FIG. 1, a texture data region is composed of a plurality of macro-block data regions, and each macro-block data region is composed of a macro-block data header information in which a coding type of the macro-block and information of a motion vector are included, four pieces of luminance block data (Y), and two pieces of color difference block data (Cb and Cr). In this embodiment, when an error occurs in one macro-block data region, the macro-block relating to the error occurrence is detected in an early stage.

Figure 2:
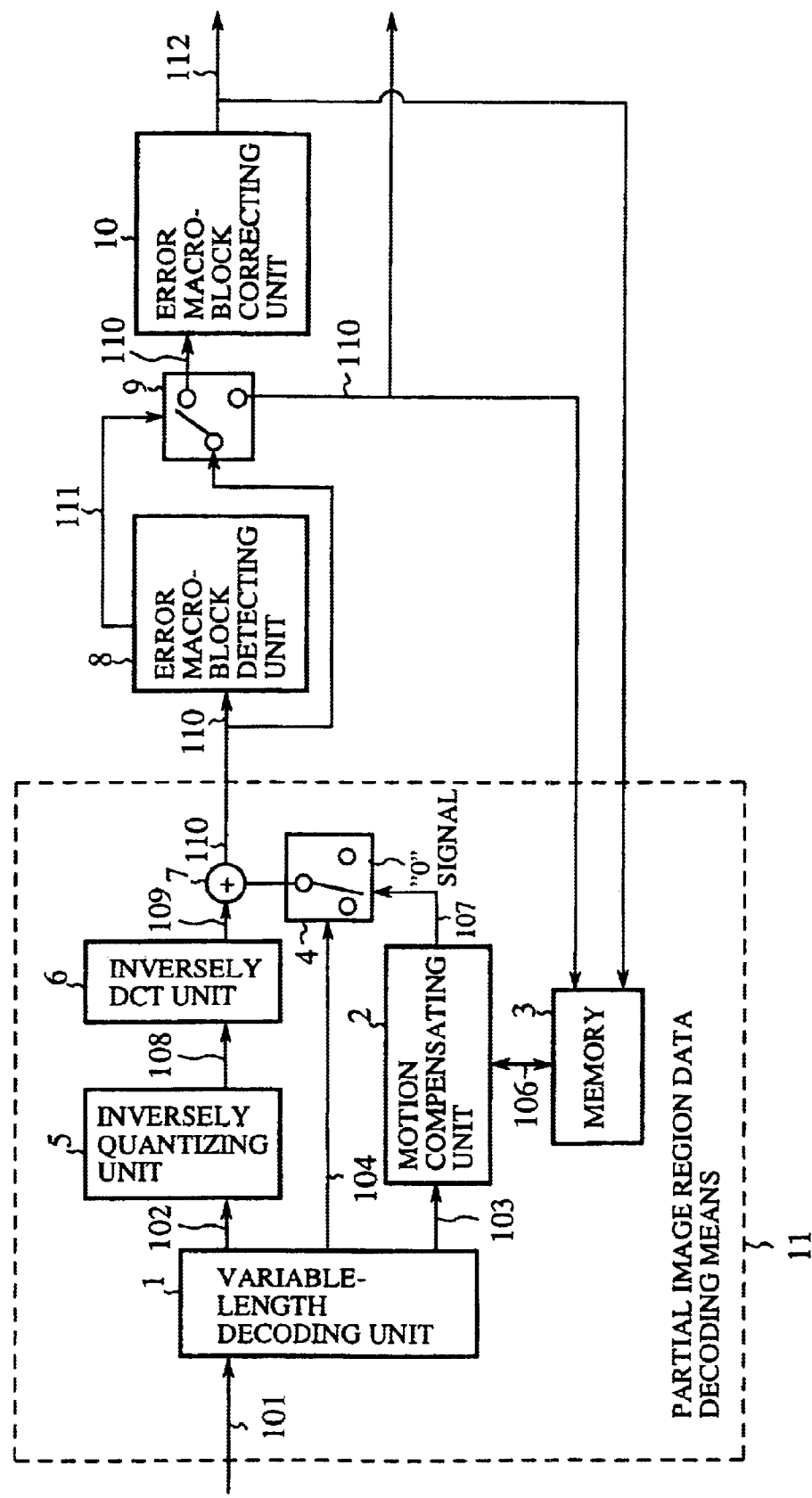
FIG. 2 is a block diagram showing the configuration of an image decoding apparatus according to a first embodiment of the present invention.

FIG. 2 is a block diagram showing the configuration of an image decoding apparatus according to the first embodiment of the present invention. In FIG. 2, 1 indicates a variable-length decoding unit for receiving a coded bit stream 101 and outputting a plurality of blocks of decoded data 102, a motion vector 103 and additional information 104. 2 indicates a motion compensating unit for receiving the motion vector 103 and outputting a predicted image 107 by using a referential image 106 stored in a memory 3. 4 indicates a change-over unit for outputting the predicted image 107 or a "0" signal according to the additional information 104.

Also, in FIG. 2, 5 indicates an inversely quantizing unit for receiving the blocks of decoded data 102 to perform an inverse quantization for each block of decoded data 102. 6 indicates an inverse DCT unit for receiving a plurality of blocks of inversely quantized data 108 from the inversely quantizing unit 5, performing an inverse DCT for each block of inversely quantized data 108 and outputting a predicted error signal 109. 7 indicates an adding unit for adding the predicted image 107 or the "0" signal received from the switching unit 4 to the predicted error signal 109 and outputting a decoded image signal 110.

In addition, in FIG. 2, 8 indicates an error macro-block detecting unit (denoting an error partial image region detecting means) for receiving the decoded image signal 110, judging whether or not an error occurs in the decoded image signal 110 and outputting an error macro-block judging result 111. 9 indicates a change-over unit for changing, according to the error macro-block judging result 111, a unit where the decoded image signal 110 is to be output. 10 indicates a macro-block correcting unit for correcting the decoded image signal 110, in which an error occurs, and outputting a corrected image signal 112. 11 indicates a partial image region data decoding means comprising the variable-length decoding unit 1, the motion compensating unit 2, the memory 3, the change-over unit 4, the inversely quantizing unit 5, the inversely DCT unit 6 and the adding unit 7.

Next, an operation of the image decoding apparatus will be described.

In the variable-length decoding unit 1, a macro-block of data is extracted from the coded bit stream 101, and a variable-length decoding is performed for the macro-block of data. In the motion compensating unit 2, a predicted image 107 is taken out according to a motion vector 103 decoded in the variable-length decoding unit 1 by referring to a referential image 106 stored in the memory 3. In the inversely quantizing unit 5, each block of decoded data 102 decoded in the variable-length decoding unit 1 is inversely quantized. In the inversely DCT unit 6, each block of inversely quantized data 108 is received from the inversely quantizing unit 5, an inverse DCT is performed for the block of inversely quantized data 108, and a predicted error signal 109 is output.

In the change-over unit 4, in cases where a macro-block type included in the additional information 104 decoded in the variable-length decoding unit 1 indicates an intra-coding, a "0" signal is selected and is output to the adding unit 7. In contrast, in cases where the macro-block type indicates a coding other than the intra-coding, the predicted image 107 taken out in the motion compensating unit 2 is selected and is output to the adding unit 7. In the adding unit 7, the predicted image 107 or the "0" signal received from the switching unit 4 is added to the predicted error signal 109 received from the inversely DCT unit 6, and a decoded image signal 110 is output. Here, the decoded image signal 110 denotes a decoded macro-block and is composed of four luminance blocks and two color difference blocks.

In the error macro-block detecting unit (that is, the error partial image region detecting means) 8, the decoded image signal 110 is received, it is judged whether or not the decoded image signal 110 exists in a decoded macro-block in which an error occurs, and an error macro-block judging result 111 is output. In the change-over unit 9, a unit where the decoded image signal 110 is to be output is changed according to the error macro-block judging result 111 output from the error macro-block detecting unit 8. In cases where the error macro-block judging result 111 indicates that the decoded image signal 110 is an error macro-block, the decoded image signal 110 is output to the macro-block correcting unit 10. In contrast, in cases where the error macro-block judging result 111 indicates that the decoded image signal 110 is not an error macro-block, not only the decoded image signal 110 is output without any correction, but also the decoded image signal 110 is stored in the memory 3 to be used as another referential image 106.

In the macro-block correcting unit 10, a processing for making the error of the error macro-block inconspicuous is performed, and a corrected image signal 112 is output. As a most simple method, a macro-block, which is placed in the same position as that of an error macro-block judged to relate to an error occurrence, is taken out from the referential image 106 of the memory 3, and the error macro-block is replaced with the macro-block taken out. The corrected image signal 112 obtained by correcting the decoded image signal 110 in the macro-block correcting unit 10 is output as a decoded image. Also, the corrected image signal 112 is stored in the memory 3 to be used as another referential image 106.

Figure 3:
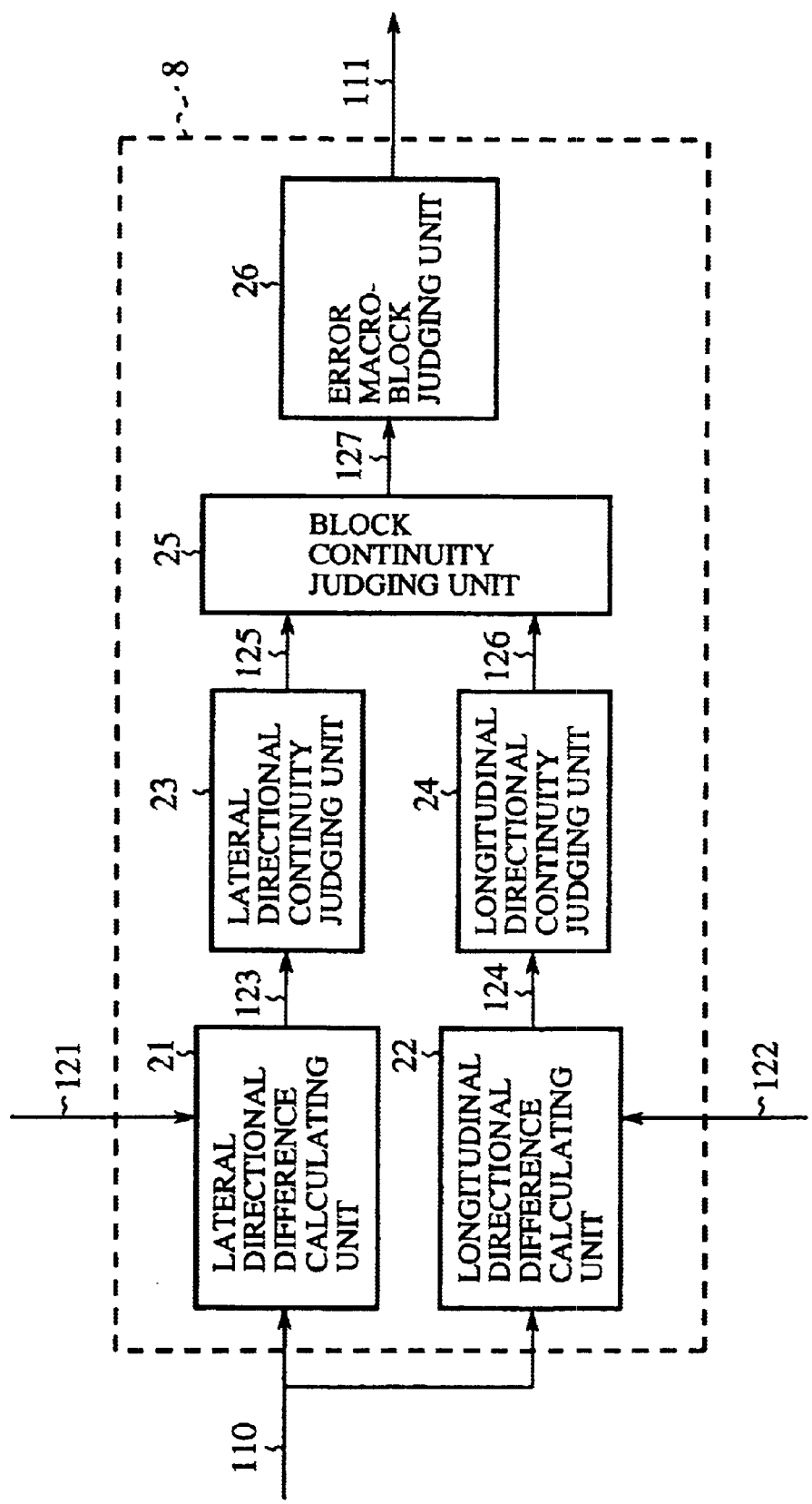
FIG. 3 is a block diagram showing an internal configuration of an error macro-block detecting unit according to the first embodiment of the present invention.

FIG. 3 is a block diagram showing an internal configuration of the error macro-block detecting unit (that is, the error partial image region detecting means) 8 indicating features of the first embodiment. In FIG. 3, 21 indicates a lateral directional difference calculating unit for receiving the decoded image signal 110 and a lateral directional block signal 121, calculating a change degree denoting a difference in pixel level between pixels adjacent to each other through a boundary of a to-be-judged block and a block adjacent to the to-be-judged block in a lateral direction, calculating a change degree denoting a difference in pixel level between pixels placed in the block adjacent to the to-be-judged block in the lateral direction and outputting the change degrees as a lateral directional inter-pixel difference 123.

Also, in FIG. 3, 22 indicates a longitudinal directional difference calculating unit for receiving the decoded image signal 110 and a longitudinal directional block signal 122, calculating a change degree denoting a difference in pixel level between pixels adjacent to each other through a boundary of the to-be-judged block and a block adjacent to the to-be-judged block in a longitudinal direction, calculating a change degree denoting a difference in pixel level between pixels placed in the block adjacent to the to-be-judged block in the longitudinal direction and outputting the change degrees as a longitudinal directional inter-pixel difference 124.

In addition, in FIG. 3, 23 indicates a lateral directional continuity judging unit for receiving the lateral directional inter-pixel difference 123, judging the continuity between the blocks adjacent to each other in the lateral direction and outputting a lateral directional continuity 125. 24 indicates a longitudinal directional continuity judging unit for receiving the longitudinal directional inter-pixel difference 124, judging the continuity between the blocks adjacent to each other in the longitudinal direction and outputting a longitudinal directional continuity 126.

In addition, in FIG. 3, 25 indicates a block continuity judging unit for receiving the lateral directional continuity 125 and the longitudinal directional continuity 126, judging the continuity between blocks adjacent to each other and outputting an adjacent-block continuity 127. 26 indicates an error macro-block judging unit for receiving the adjacent-block continuity 127, judging according to the adjacent-block continuity 127 whether or not the decoded image signal 110 is an error macro-block and outputting the error macro-block judging result 111.

Next, an operation of the error macro-block detecting unit 8 will be described.

Figure 4:
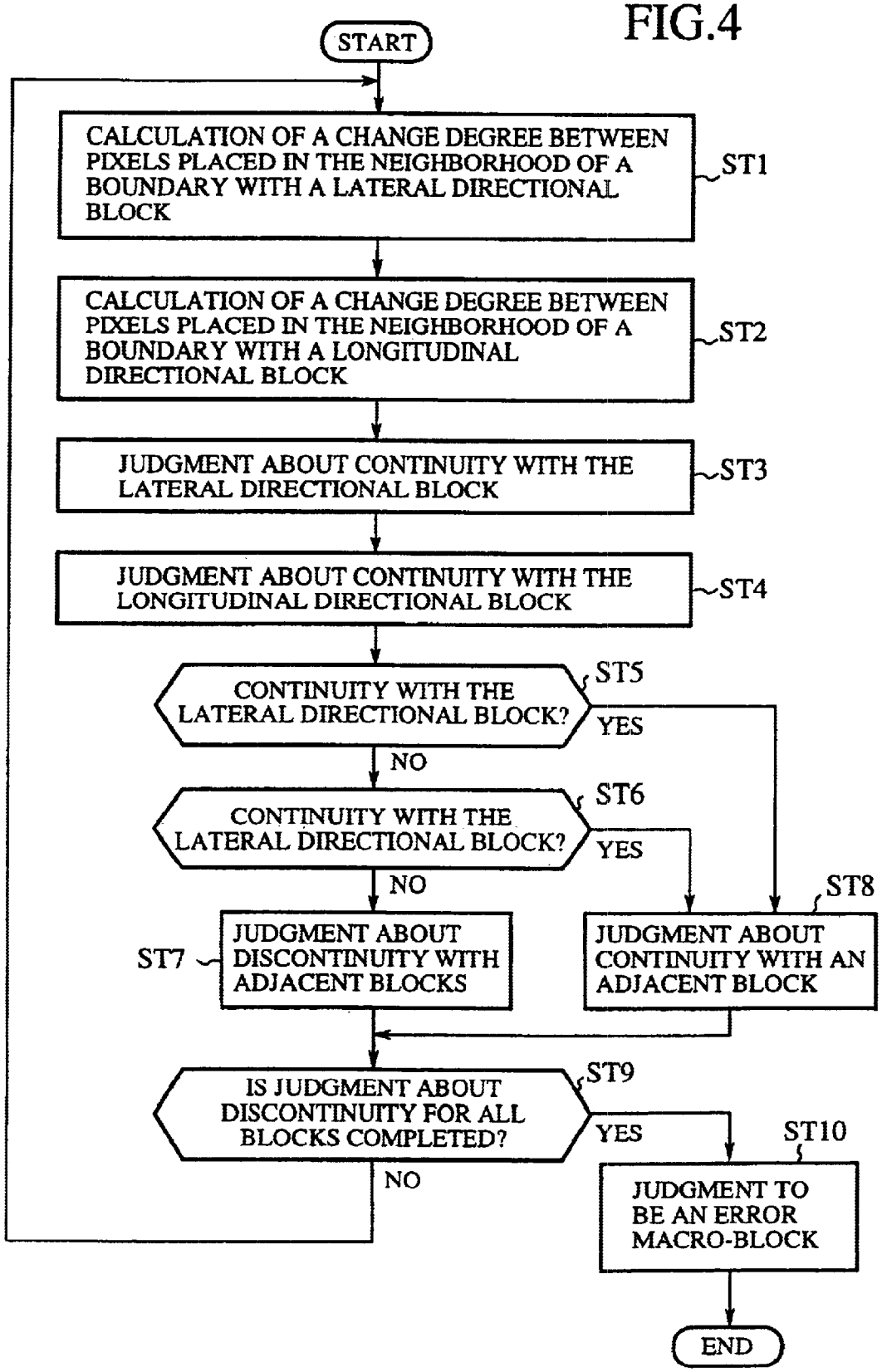
FIG. 4 is a flow chart showing an operation of the error macro-block detecting unit according to the first embodiment of the present invention.

FIG. 4 is a flow chart showing an operation of the error macro-block detecting unit 8.

In the error macro-block detecting unit 8, it is judged according to the continuity of an image signal whether or not the decoded image signal 110 is an image signal of a macro-block in which an error occurs. The image signal has normally a strong correlation between pixels adjacent to each other, and values of pixels existing in one object are continuously changed. However, in an image signal of a block in which an error occurs, there is high possibility that the continuity between blocks adjacent to each other is not maintained. In this embodiment, a macro-block in which an error occurs is detected by using the continuity between blocks adjacent to each other.

Figure 5:
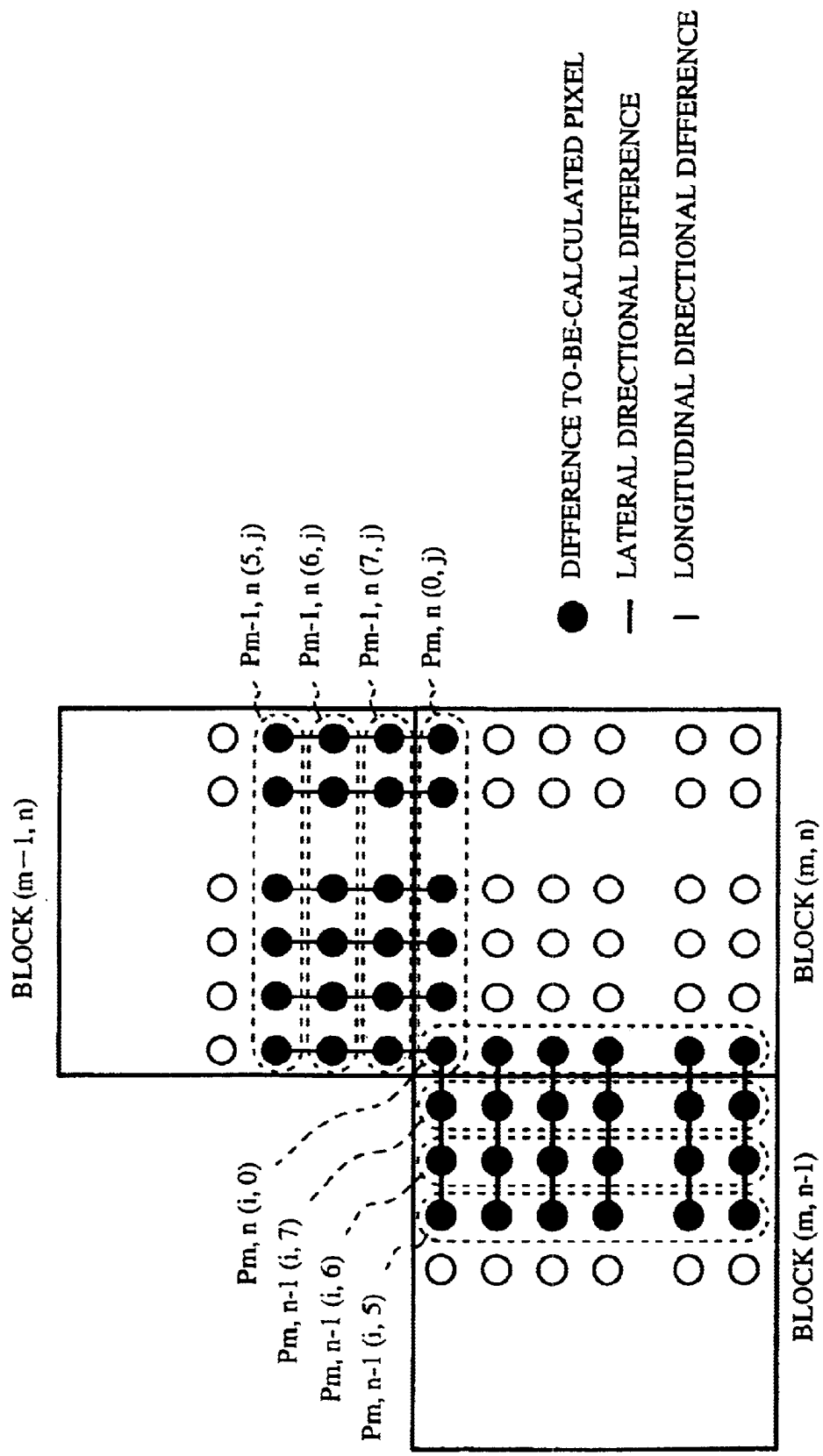
FIG. 5 is a diagram explaining the processing of a lateral directional difference calculating unit and the processing of a longitudinal directional difference calculating unit according to the first embodiment of the present invention.

FIG. 5 is a diagram explaining the processing of the lateral directional difference calculating unit 21 and the processing of the longitudinal directional difference calculating unit 22.

In a step ST1 of FIG. 4, in the lateral directional difference calculating unit 21, a decoded image signal 110 corresponding to a to-be-judged block (m, n) of FIG. 5 and a lateral directional block signal 121 corresponding to a block (m, n−1) of FIG. 5 arranged in the lateral direction to the block (m, n) are received, a change degree (or a difference value) between levels of each pair of pixels adjacent to each other in the lateral direction is calculated for pixels $P_{m,n-1}(i, 5)$ to $P_{m,n-1}(i, 7)$ of three columns of the block (m, n−1) placed in the neighborhood of a boundary between the blocks (m, n) and (m, n−1) and pixels $P_{m,n}(i, 0)$ of one column of the block (m, n) placed in the neighborhood of the boundary. The change degrees are calculated for each of the color difference blocks and the luminance blocks. Thereafter, the calculated change degrees are output as the lateral directional inter-pixel difference 123.

A change degree (or a difference value) between levels of each pair of pixels adjacent to each other in the lateral direction is calculated according to an equation (1).

$$DP_{m,n-1}(i,j+1)=P_{m,n-1}(i,j)-P_{m,n-1}(i,j+1)(i=0,1,---,7, \text{ and } j=5,6)$$

$$DP_{m,n}(i,0)=P_{m,n-1}(i,7)-P_{m,n}(i,0) \ (i=0,1,---,7) \qquad (1)$$

In a step ST2, in the longitudinal directional difference calculating unit 22, the decoded image signal 110 corresponding to the to-be-judged block (m, n) and a longitudinal directional block signal 122 corresponding to a block (m−1, n) of FIG. 5 arranged in the longitudinal direction to the block (m, n) are received, a difference value between levels of each pair of pixels adjacent to each other in the longitudinal direction is calculated for pixels $P_{m-1,n}(5, j)$ to $P_{m-1,n}(7, j)$ of three rows of the block (m−1, n) placed in the neighborhood of a boundary between the blocks (m, n) and (m−1, n) and pixels $P_{m,n}(0, j)$ of one row of the block (m, n) placed in the neighborhood of the boundary. The difference values are calculated for each of the color difference blocks and the luminance blocks. Thereafter, the difference values are output as the longitudinal directional inter-pixel difference 124. In a step ST3 of FIG. 4, in the lateral directional continuity judging unit 23, the existence of a correlation between the decoded block (m, n) and the block (m, n−1) adjacently placed on the left side of the decoded block (m, n) is judged according to the change degrees (or the difference values), which is calculated in the lateral directional difference calculating unit 21, in the pixels placed in the neighborhood of the block boundary. In other words, the existence of the correlation is judged according to the lateral directional inter-pixel difference 123 expressed by the equation (1), and the lateral directional continuity 125 is output. In cases where the correlation with the block (m, n−1) adjacently placed on the left side of the decoded block (m, n) does not exist, the group of pixels of the decoded block (m, n) placed in the neighborhood of the boundary with the block (m, n−1) adjacent on the left side has a discontinuity for the group of pixels of the block (m, n−1).

In cases where the group of pixels of the decoded block (m, n) placed in the neighborhood of the block boundary has a discontinuity, a type of change degree (or a type of difference value) in the pixel level from $P_{m,n-1}(i, 7)$ to $P_{m,n}(i, 0)$ is large as compared with another type of change degree (or another type of difference value) in the pixel level from $P_{m,n-1}(i, 5)$ to $P_{m,n-1}(i, 7)$. Therefore, the existence of the discontinuity is judged according to these two types of change degrees (or the difference values) in the pixel level. Initially, a change degree (or a difference value) $\Delta P_{m,n-1}(i, 7)$ between a change degree (or a difference value) $DP_{m,n-1}(i, 6)$ between the adjacent pixels $P_{m,n-1}(i, 5)$ and $P_{m,n-1}(i, 6)$ and a change degree (or a difference value) $DP_{m,n-1}(i, 7)$ between the adjacent pixels $P_{m,n-1}(i, 6)$ and $P_{m,n-1}(i, 7)$ is calculated according to an equation (2).

$$\Delta P_{m,n-1}(i,7)=DP_{m,n-1}(i,6)-DP_{m,n-1}(i,7) \ (i=0, 1, ---, 7) \qquad (2)$$

In the same manner, a change degree (or a difference value) $\Delta P_{m,n}(i, 0)$ between the change degree (or the difference value) $DP_{m,n-1}(i, 7)$ between the adjacent pixels $P_{m,n-1}(i, 6)$ and $P_{m,n-1}(i, 7)$ and a change degree (or a difference value) $DP_{m,n}(i, 0)$ between the adjacent pixels $P_{m,n-1}(i, 7)$ and $P_{m,n}(i, 0)$ is calculated according to an equation (3).

$$\Delta P_{m,n}(i,0)=DP_{m,n-1}(i,7)-DP_{m,n}(i,0)(i=0,1,---,7) \qquad (3)$$

Thereafter, the existence of a discontinuity is judged by judging a change degree (or a difference value) between the change degree (or the difference value) $\Delta P_{m,n-1}(i, 7)$ calculated in the equation (2) and the change degree (or the difference value) $\Delta P_{m,n}(i, 0)$ calculated in the equation (3) according to a prescribed threshold value TH1. That is, in cases where a following equation (4) is satisfied for the prescribed threshold value TH1 predetermined, it is judged that the pixel $P_{m,n}(i, 0)$ of the i-th row is discontinued.

$$|\Delta P_{m,n}(i,0)|-|\Delta P_{m,n-1}(i,7)|>TH1 \qquad (4)$$

In cases where it is judged that all the pixels placed at the block boundary are discontinued, it is judged that the block (m, n) is discontinued with the lateral directional block (m, n−1).

In a step ST4 of FIG. 4, in the longitudinal directional continuity judging unit 24, in the same manner as in the lateral longitudinal directional continuity judging unit 23, the existence of a correlation between the decoded block (m, n) and the block (m-1, n) placed on the upper side of the decoded block (m, n) is judged according to the change degrees (or the difference values), which is calculated in the longitudinal directional difference calculating unit 22, in the pixels placed in the neighborhood of the block boundary. In other words, the existence of the correlation is judged according to the longitudinal directional inter-pixel difference 124, and the longitudinal directional continuity 126 is output.

In a step ST5, in the block continuity judging unit 25, it is judged according to the lateral directional continuity 125 denoting a judging result of the lateral directional continuity judging unit 23 whether or not the decoded block is continuous with the block adjacently arranged on the left side of the decoded block. As a result of the judgment, in cases where the decoded block is continuous with the block adjacently arranged on the left side of the decoded block, in a step ST8, the block continuity judging unit 25 judges that the decoded block is continuous with the adjacent block.

Also, in the step ST5, as a result of the judgment, in cases where the decoded block is not continuous with the block adjacently arranged on the left side of the decoded block, in a step ST6, the block continuity judging unit 25 judges according to the longitudinal directional continuity 126 denoting a judging result of the longitudinal directional continuity judging unit 24 whether or not the decoded block is continuous with the block adjacently arranged on the upper side of the decoded block. As a result of the judgment, in cases where the decoded block is continuous with the block adjacently arranged on the upper side of the decoded block, in the step ST8, the block continuity judging unit 25 judges that the decoded block is continuous with the adjacent block.

In contrast, in the step ST6, as a result of the judgment, in cases where the decoded block is not continuous with the block adjacently arranged on the upper side of the decoded block, in a step ST7, the block continuity judging unit 25 judges that the decoded block is discontinuous with all adjacent blocks. As is described above, in cases where the decoded block is discontinuous with both the block arranged in the lateral direction and the block arranged in the longitudinal direction, the decoded block is judged to be discontinuous with all adjacent blocks.

In a step ST9, the judgment of the continuity of the decoded block with the adjacent block is completed for all luminance blocks and all color difference blocks, the block continuity judging unit 25 outputs the adjacent-block continuity 127 as a result of the judgment. In a step ST10, the error macro-block judging unit 26 judges according to the adjacent-block continuity 127 whether or not the decoded image signal 110 denoting a decoded macro-block is an error macro-block.

That is, the error macro-block judging unit 26 judges according to thecontinuity of each of the color difference blocks and the luminance blocks whether or not the decoded macro-block is an error macro-block. For example, in cases where the discontinuity is detected in one block selected from among the four luminance blocks and the two color difference blocks, the error macro-block judging unit 26 judges that a macro-block including the block relating to the discontinuity is a macro-block in which an error occurs. Also, it is applicable that the error macro-block judging unit 26 judge according to a combination of the judgments of the continuity in the four luminance blocks and the two color difference blocks.

In the first embodiment, the error block judgment is performed by using the difference value between levels of the adjacent pixels in the lateral direction which are selected from the pixels $P_{m,n-1}(i, 5)$ to $P_{m,n-1}(i, 7)$ of three columns of the block (m, n-1) placed in the neighborhood of a boundary between the blocks (m, n) and (m, n-1) and the pixels $P_{m,n}(i, 0)$ of one column of the block (m, n) placed in the neighborhood of the boundary. However, the used pixel columns and the number of used pixel columns are not limited in the present invention. Therefore, it is applicable that change degrees (or difference values) be examined in a wider range to be used for the error block judgment. Also, in this embodiment, in FIG. 5, the change degree (or the difference value) between levels of each pair of pixels adjacent to each other is used. However, it is applicable that a change degree (or a difference value) between levels of each pair of pixels arranged through another pixel be used. Also, these modifications of the first embodiment can be applied for the judgment of the continuity between the decoded block (m, n) and the block (m-1, n) arranged in the longitudinal direction.

Also, in this embodiment, in the step ST3, the lateral directional continuity judging unit 23 judges the continuity in the lateral direction by using the change degree $\Delta P_{m,n-1}(i, 7)$ calculated according to the equation (2) and the change degree $\Delta P_{m,n}(i, 0)$ calculated according to the equation (3) and performing the comparison with the prescribed threshold value TH1 according to the equation (4). However, it is applicable that the continuity in the lateral direction be judged by comparing the change degree $\Delta P_{m,n}(i, 0)$ calculated according to the equation (3) with another prescribed threshold value TH1a. This modification can be applied in the longitudinal directional continuity judging unit 24.

As is described above, in the first embodiment, because a macro-block, in which an error occurs, is detected by using the continuity of the image signal with a block adjacent to the image signal, the error can detected in an early stage, the degradation of an image quality caused by the error propagation or the error can be suppressed to the minimum degree, a macro-block, in which an error occurs, can be reliably detected by considering not only the change degree between a level of a peripheral pixel of the to-be-judged block and a level of a peripheral pixel of the block adjacent to the to-be-judged block but also the change degree between levels of pixels placed in the block adjacent to the to-be-judged block.

Embodiment 2

A block diagram showing the configuration of an image decoding apparatus according to a second embodiment of the present invention is the same as that shown in FIG. 2 according to the first embodiment. In this embodiment, the threshold value used in the lateral directional continuity judging unit 23 and the longitudinal directional continuity judging unit 24 of the error macro-block detecting unit 8 in the first embodiment is adaptively changed according to a quantization step size of each macro-block.

As is described in the first embodiment, in cases where the quantization is performed for each block after an orthogonal transformation such as DCT is performed for each block, a noise, which is peculiar to the orthogonal transformation coding and is called a block distortion, occurs. Because of this block distortion, there is a case that a change degree between levels of pixels placed in the neighborhood of the block boundary becomes large. Therefore, in the error macro-block detecting unit 8 according to the second embodiment, a threshold value control unit, in which the threshold value is adaptively controlled, is arranged by considering the influence of the block distortion.

Figure 6:
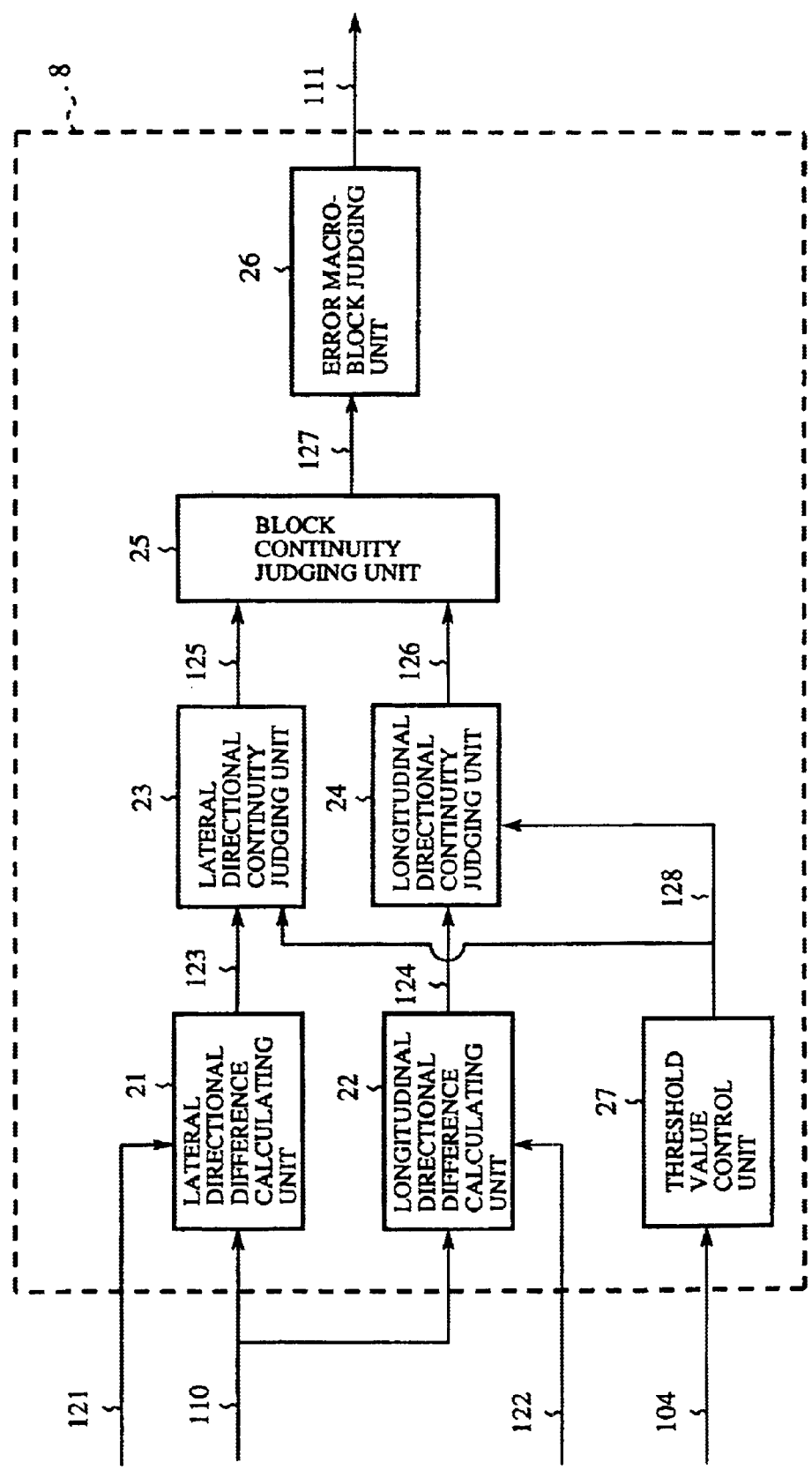
FIG. 6 is a block diagram showing an internal configuration of an error macro-block detecting unit according to a second embodiment of the present invention.

FIG. 6 is a block diagram showing an internal configuration of the error macro-block detecting unit (that is, the error partial image region detecting means) 8 according to the second embodiment. In FIG. 6, 27 indicates a threshold value control unit for controlling a threshold value 128 according to a quantization step size of a macro-block. The quantization step size is included in the additional information 104 decoded in the variable-length decoding unit 1 shown in FIG. 2. The operations of the lateral directional difference calculating unit 21, the lateral directional continuity judging unit 23, the longitudinal directional difference calculating unit 22, the longitudinal directional continuity judging unit 24, the block continuity judging unit 25 and the error macro-block judging unit 26 are the same as those in the first embodiment.

Figure 7:
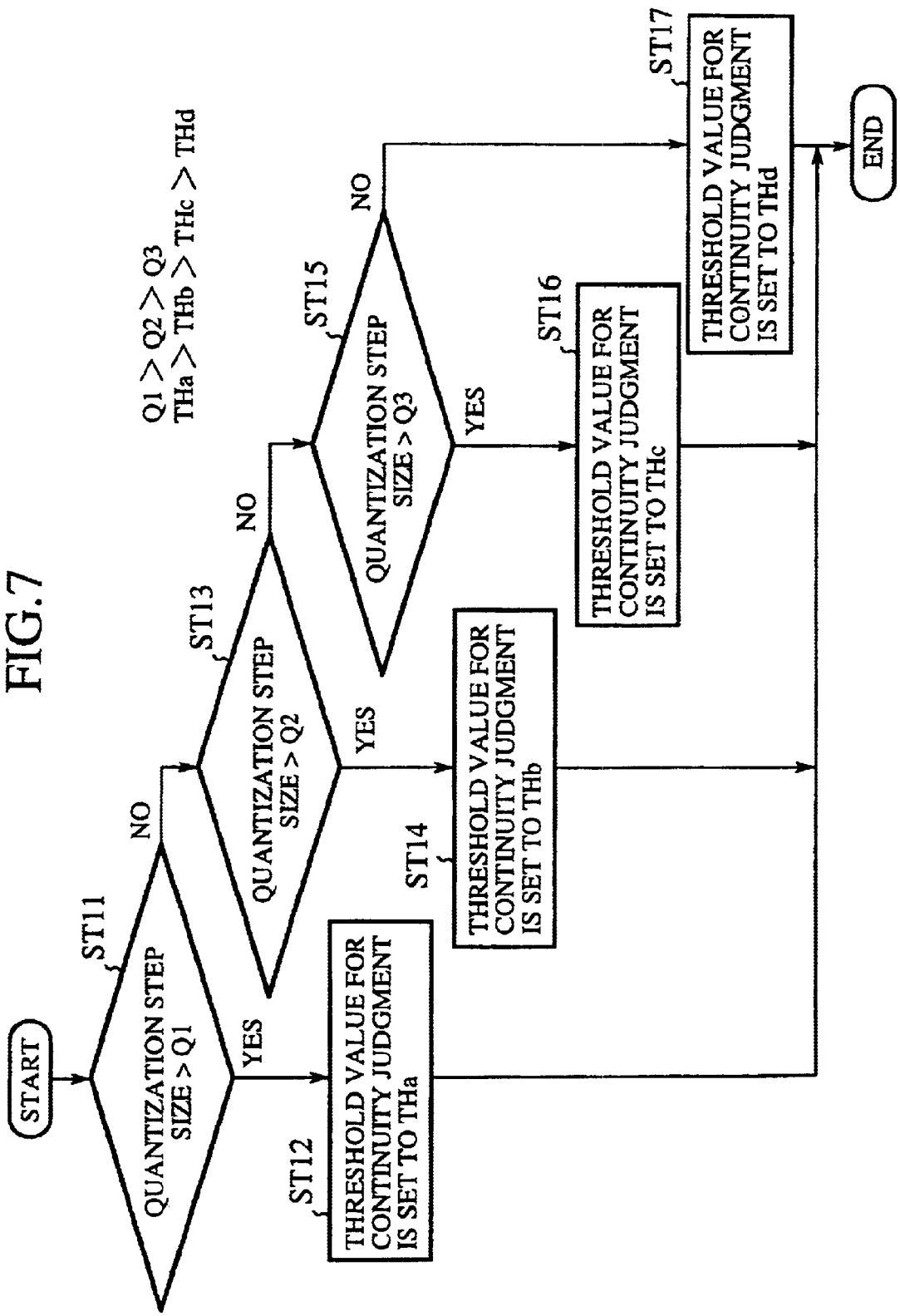
FIG. 7 is a flow chart showing an operation of a threshold value control unit according to the second embodiment of the present invention.

Next, an operation is described. FIG. 7 is a flow chart showing an operation of the threshold value control unit 27 according to the second embodiment. The threshold value control unit 27 controls a threshold value 128 according to a quantization step size of a macro-block included in the additional information 104. In a step ST11, the threshold value control unit 27 confirms whether or not the quantization step size of a macro-block included in the additional information 104 is larger than a prescribed value Q1. In cases where the quantization step size is larger than the prescribed value Q1, because there is a case that a change degree (or a difference value) between levels of pixels placed in the neighborhood of the block boundary becomes large because of a block distortion, in a step ST12, the threshold value used for the judgment of the continuity is set to a high value THa in the threshold value control unit 27 according to the quantization step size larger than the prescribed value Q1.

In contrast, in the step ST11, in cases where the quantization step size is smaller than the prescribed value Q1, in a step ST13, the threshold value control unit 27 confirms whether or not the quantization step size is larger than a prescribed value Q2 (Q2<Q1). In cases where the quantization step size is larger than the prescribed value Q2, in a step ST14, the threshold value used for the judgment of the continuity is set to a value THb lower than the value THa in the threshold value control unit 27 according to the quantization step size.

In the same manner, the processing in a step ST15, a step ST16 and a step ST17 is performed, in cases where the quantization step size is larger than the prescribed value Q3 (Q3<Q2<Q1), the threshold value is set to a value THc. In cases where the quantization step size is smaller than the prescribed value Q3, because the influence of the block distortion is low, the threshold value is set to a value THd (THd<THc<THb<THa) according to the quantization step size smaller than the prescribed value Q3.

In the processing of FIG. 7, a range of the quantization step size is divided at four ranks, and the threshold value is set according to each value of the quantization step size. However, the present invention is not limited to the four ranks, and the threshold value can be adaptively set according to quantization characteristics.

In FIG. 6, the threshold value 128 set by the threshold value control unit 27 is output to the lateral directional continuity judging unit 23 and the longitudinal directional continuity judging unit 24 and is used as a threshold value for the judgment of the continuity with the lateral directional block signal 121 and the judgment of the continuity with the longitudinal directional block signal 122 in the same manner as in the first embodiment.

As is described above, in the second embodiment, because the threshold value used for the judgment of the continuity with the adjacent block is controlled according to the quantization step size, the discontinuity at the block boundary caused by the block distortion can be distinguished from the discontinuity at the block boundary caused by the error, so that it can avoid to erroneously judge a macro-block, in which a block distortion occurs, to be a macro-block in which an error occurs.

Embodiment 3

A block diagram showing the configuration of an image decoding apparatus according to a third embodiment of the present invention is the same as that shown in FIG. 2 according to the first embodiment. In the first embodiment, the discontinuity between blocks is judged according to the inter-pixel difference value between pixels placed in the neighborhood of the block boundary, and the detection of an error macro-block is performed. However, in the third embodiment, an error macro-block is detected according to a representative value of pixel levels calculated for each block.

Figure 8:
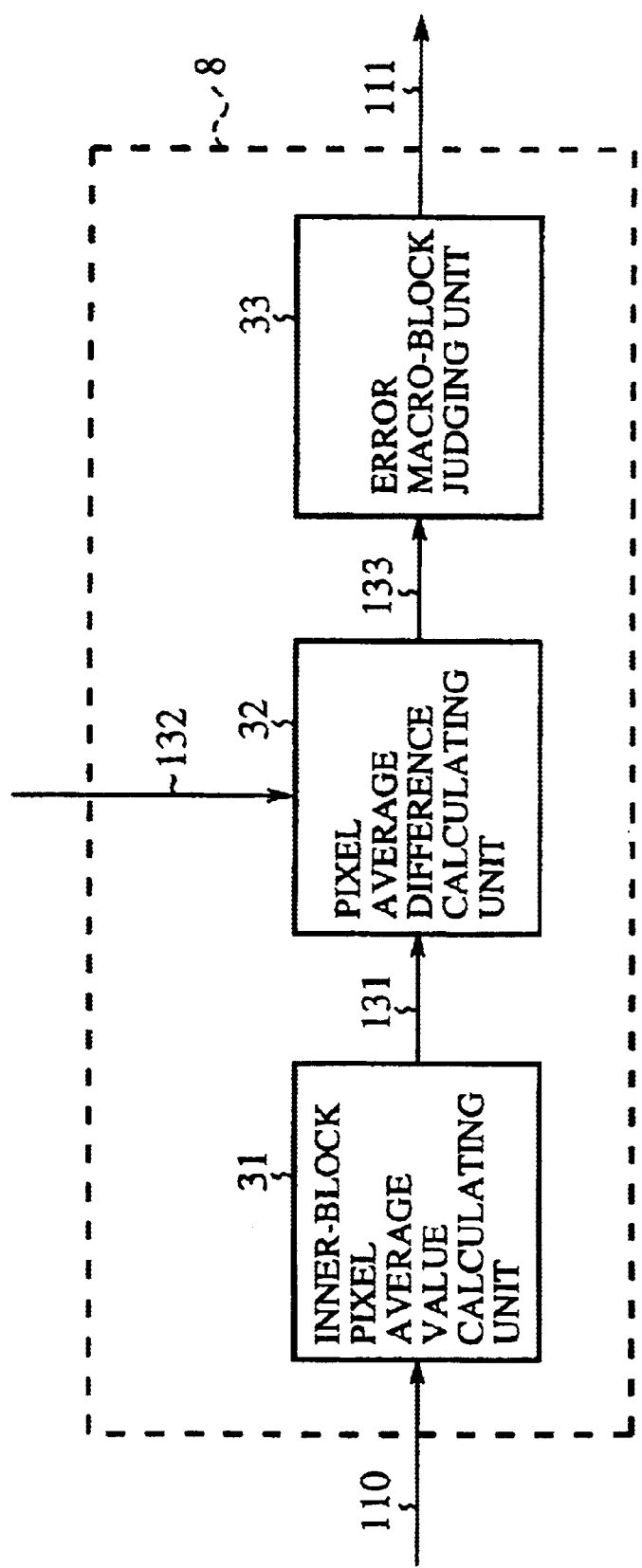
FIG. 8 is a block diagram showing an internal configuration of an error macro-block detecting unit according to a third embodiment of the present invention.

FIG. 8 is a block diagram showing an internal configuration of the error macro-block detecting unit (that is, the error partial image region detecting means) 8 according to the third embodiment. In FIG. 8, 31 indicates an inner-block pixel average value calculating unit for receiving the decoded image signal 110, calculating an inner-block pixel average value as a representative value of pixel levels of one decoded block (or one to-be-judged block) for each decoded block and outputting the inner-block pixel average values as a plurality of pixel level average values 131. 32 indicates a pixel average difference calculating unit for receiving the pixel level average value 131 of each decoded block, receiving a neighboring block pixel level average value 132 denoting a representative value of pixel levels of one neighboring block stored in a prescribed memory for each neighboring block placed in the neighborhood of the decoded block, calculating a difference between one pixel level average value 131 and the neighboring block pixel level average value 132 of each neighboring block for each decoded block and outputting each difference as a pixel average difference 133. 33 indicates an error macro-block judging unit for receiving the pixel average differences 133, judging to be or not to be an error macro-block and outputting an error macro-block judging result 111.

Next, an operation will be described.

Figure 9:
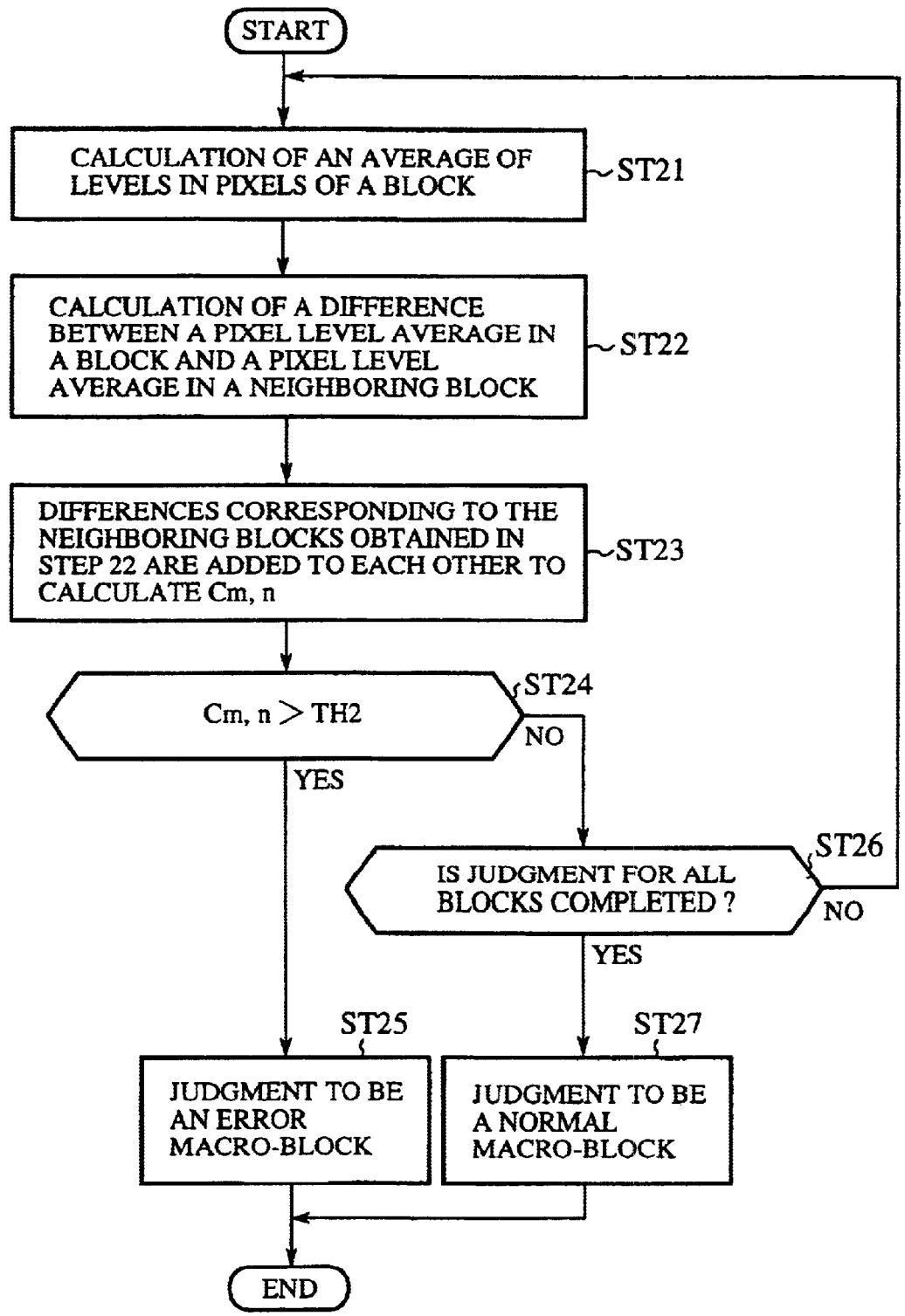
FIG. 9 is a flow chart showing an operation of the error macro-block detecting unit according to the third embodiment of the present invention.

FIG. 9 is a flow chart showing an operation of the error macro-block detecting unit 8 according to the third embodiment. The following processing is performed in the error macro-block detecting unit 8 for each of the color difference blocks and the luminance blocks of the decoded image signal 110. In a step ST21, the decoded image signal 110 is received in the inner-block pixel average value calculating unit 31, and an average value of pixel values in one decoded block (m,n) is calculated according to an equation (5) for each decoded block.

$$AveP_{m,n} = \sum_{i,j=0}^{7} P_{m,n}(i, j)/64 \quad (5)$$

In a step ST22, in the pixel average difference calculating unit 32, a pixel average difference 133 ($\Delta AveP_{m,n,s,t}$) between the pixel level average value 131 ($AveP_{m,n}$) of the decoded block calculated in the inner-block pixel average value calculating unit 31 and a pixel level average value 132 ($AveP_{s,t}$) of each neighboring block is calculated according to an equation (6).

$$\Delta AveP_{m,n,s,t} = AveP_{s,t} - AveP_{m,n} \quad (6)$$

FIG. 10 is a diagram showing a plurality of neighboring blocks for which a difference calculation is performed. For example, as shown in FIG. 10, four neighboring blocks exist. A sign s,t in the equation (6) denotes each of (m, n−1), (m−1, n−1), (m−1, n) and (m−1, n+1) of the neighboring blocks shown in FIG. 10.

In the error macro-block judging unit 33, in the processing of a step ST23 and steps after the step ST23, the existence of an error macro-block is judged by using 10 the pixel average difference 133 from each neighboring block calculated in the pixel average difference calculating unit 32, and an error macro-block judging result 111 is output.

As an error macro-block judging method, in the step ST23, a pixel average absolute difference from a pixel average of each neighboring block is calculated in the error macro-block judging unit 33, for example, according to an equation (7) for each of the color difference blocks and the luminance blocks to calculate a value $C_{m,n}$ obtained by adding all pixel average absolute differences for all neighboring blocks to each other.

$$C_{m,n} = |\Delta AveP_{m,n,m-1,n-1}| + |\Delta AveP_{m,n,m-1,n}| + |\Delta AveP_{m,n,m-1,n+1}| + |\Delta AveP_{m,n,m,n-1}| \quad (7)$$

Thereafter, in a step ST24, the existence of an error macro-block is judged in the error macro-block judging unit 33 by comparing the value $C_{m,n}$ obtained according to the equation (7) with a prescribed threshold value TH2 according to an equation (8). That is, in cases where a relationship expressed in the equation (8) is satisfied for the prescribed threshold value TH2 predetermined, the corresponding decoded block is judged to be an error block.

$$C_{m,n} > TH2 \quad (8)$$

In a step ST25, the error macro-block judging unit 33 judges that a macro-block including the error block is an error macro-block.

In contrast, in the step ST24, the relationship expressed in the equation (8) is not satisfied, in a step ST26, it is examined whether or not the error judgment for all decoded blocks of the corresponding macro-block is performed. In cases where it is judged that each of the all decoded blocks is not an error block, in a step ST27, the error macro-block judging unit 33 judges that the decoded image signal 110 is a normal macro-block.

Also, in cases where a sum of the pixel average absolute differences for all neighboring blocks is calculated for each decoded block, it is applicable that a weighting factor is added to each absolute difference according to an equation (9).

$$C_{m,n} = W1|\Delta AveP_{m,n,m-1,n-1}| + W2|\Delta AveP_{m,n,m-1,n}| + W3|\Delta Ave\ P_{m,n,m-1,n+1}| + W4|\Delta AveP_{m,n,m,n-1}| \quad (9)$$

Therefore, in cases where the correlation of the decoded block with the neighboring blocks is not uniform, the difference from one neighboring block, with which the correlation is strong, can be preferentially treated.

In this embodiment, the average value of the pixel levels of each block is used as a representative value of the pixels levels. However, it is applicable that a variance of the pixel levels of each block be used as a representative value of the pixels levels.

As is described above, in the third embodiment, the representative value is calculated for each decoded image block, the representative value of the decoded image block is compared with the representative value of each neighboring block for each decoded image block, and a macro-block, in which an error occurs, is detected. Therefore, because a macro-block, in which an error occurs, can be detected, the error can be detected in an early stage, and an error propagation or the degradation of an image quality caused by the error can be suppressed to the minimum degree.

Embodiment 4

A block diagram showing the configuration of an image decoding apparatus according to a third embodiment of the present invention is the same as that shown in FIG. 2 according to the first embodiment. In this embodiment, the threshold value, which is used in the error macro-block judging unit 33 of the error macro-block detecting unit 8 described in the third embodiment, is adaptively controlled according to the quantization step size of each macro-block.

As is described in the first embodiment, in cases where the quantization is performed for each block after an orthogonal transformation such as DCT is performed for each block, when the quantization step size is large, an amplitude of the image signal is smoothed, so that the amplitude is made small. Therefore, in cases where the quantization step size is large, there is a case that the pixel average value of each block is made small. Therefore, in the error macro-block detecting unit 8 according to this embodiment, a threshold value control unit, in which the threshold value is controlled, is arranged by considering the influence of the quantization step size.

Figure 11:
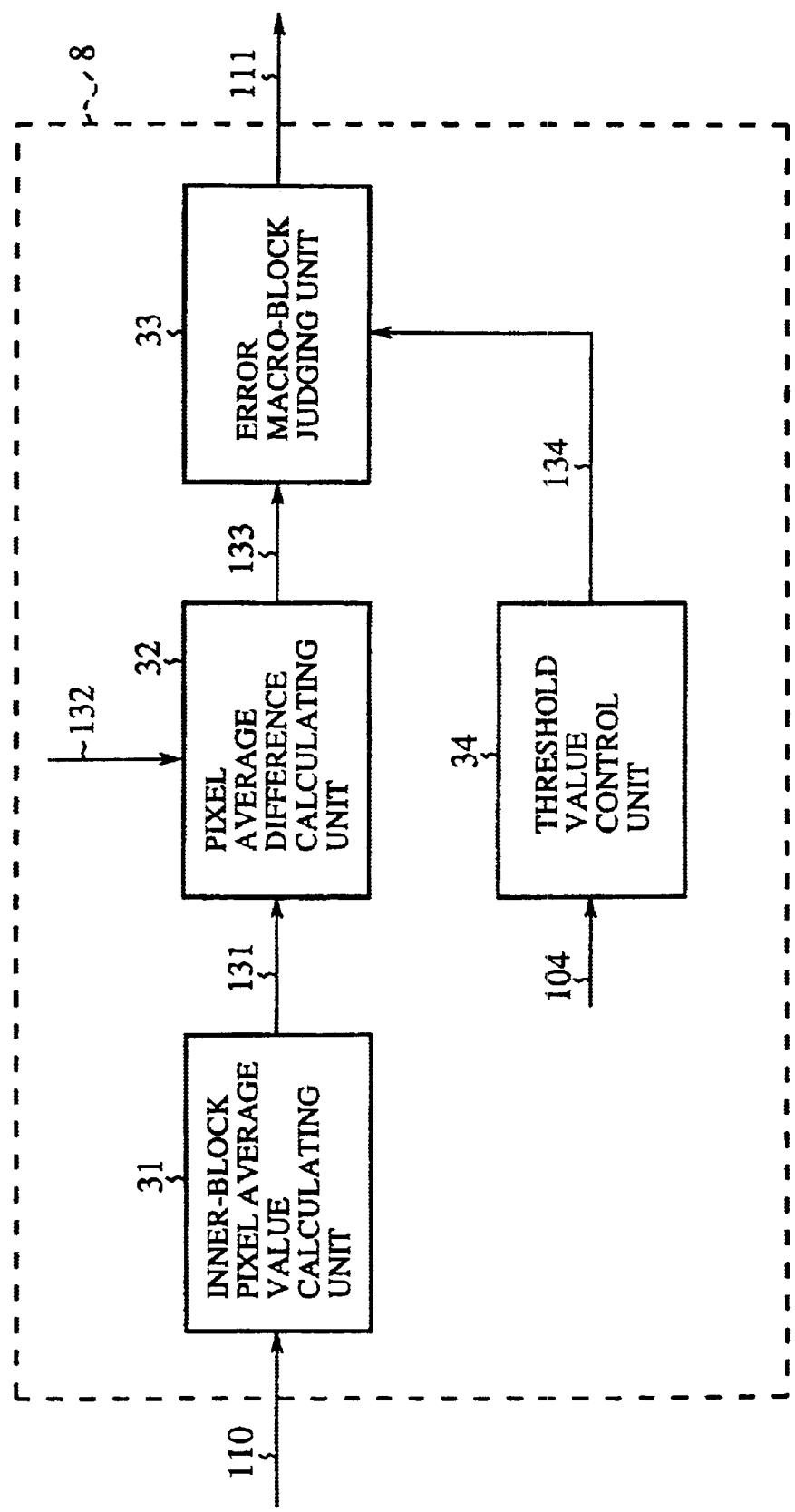
FIG. 11 is a block diagram showing an internal configuration of an error macro-block detecting unit according to a fourth embodiment of the present invention.

FIG. 11 is a block diagram showing an internal configuration of the error macro-block detecting unit (that is, the error partial image region detecting means) 8 according to the fourth embodiment of the present invention. In FIG. 11, 34 indicates a threshold value control unit for setting a threshold value 134 according to a quantization step size of each macro-block. The quantization step size is included in the additional information 104 decoded in the variable-length decoding unit 1 shown in FIG. 2. The operations of the inner-block pixel average value calculating unit 31, the pixel average difference calculating unit 32 and the error macro-block judging unit 33 are the same as those in the third embodiment.

Next, an operation is described.

The threshold value control unit 34 controls a threshold value 134 according to a quantization step size of each macro-block included in the additional information 104. For example, in cases where the quantization step size is large, because an amplitude of the image signal is made small, there is a case that the pixel average value of each block is made small. Therefore, the threshold value 134 is set to a low value. Also, in cases where the quantization step size is small, because the amplitude of the image signal is maintained, the pixel average value of each block is not made small. Therefore, the threshold value 134 is set to a high value.

The threshold value 134 set in the threshold value control unit 34 is output to the error macro-block judging unit 33, and the threshold value 134 is used to judge the corresponding macro-block to be or not to be an error macro-block.

As is described above, in the fourth embodiment, because the threshold value used for the judgment to be or not to be an error macro-block is controlled according to the quantization step size, an erroneous judgment for the macro-block, in which an error occurs, can be avoided.

Embodiment 5

A block diagram showing the configuration of an image decoding apparatus according to a third embodiment of the present invention is the same as that shown in FIG. 2 according to the first embodiment. In this embodiment, the judgment to be or not to be an error macro-block is performed by combining the error macro-block judging methods described in the first to fourth embodiments.

Figure 12:
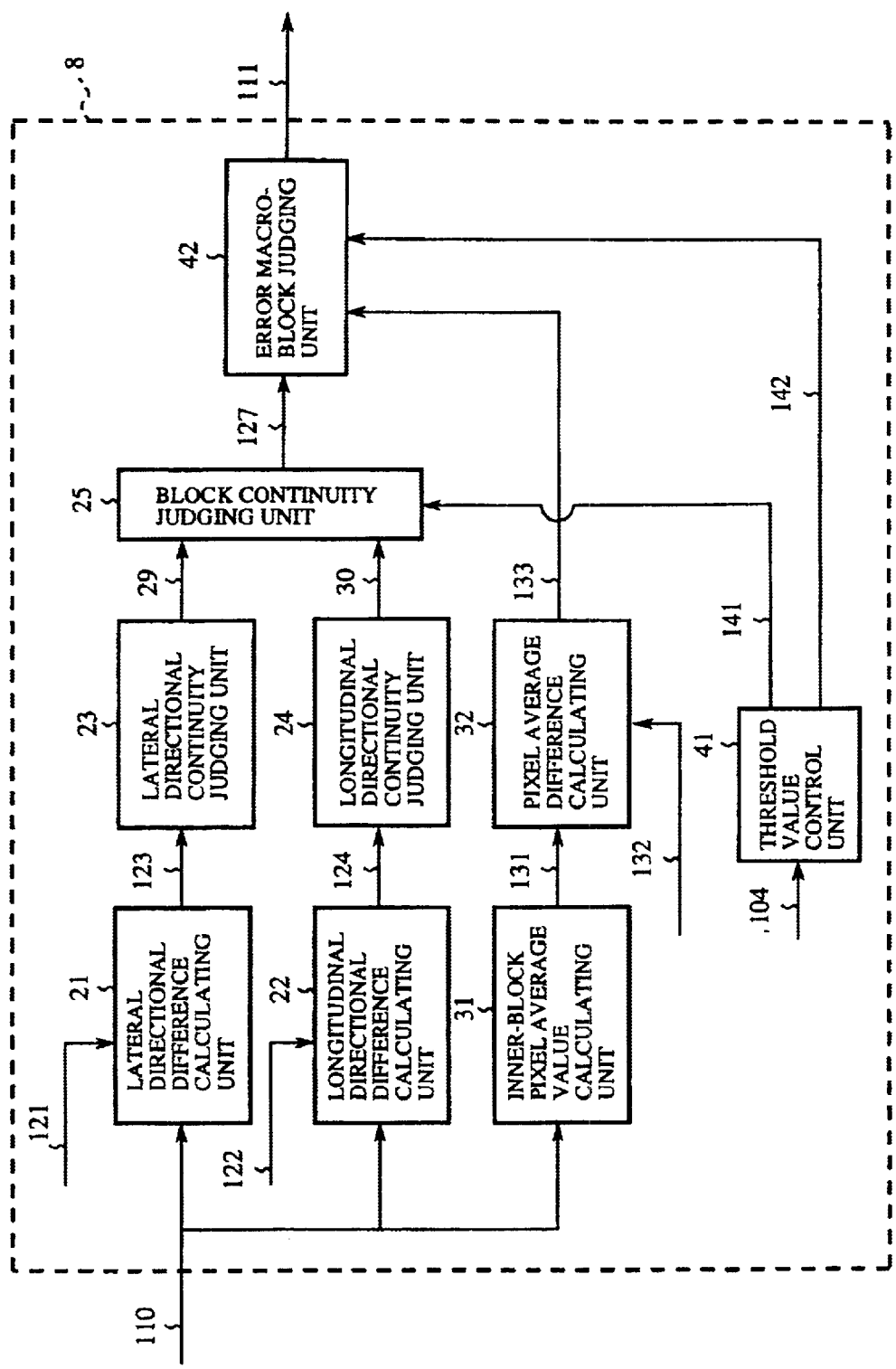
FIG. 12 is a block diagram showing an internal configuration of an error macro-block detecting unit according to a fifth embodiment of the present invention.

FIG. 12 is a block diagram showing an internal configuration of the error macro-block detecting unit (that is, the error partial image region detecting means) 8 according to a fifth embodiment. In FIG. 12, 41 indicates a threshold value control unit for setting a prescribed threshold value 141 and a prescribed threshold value 142 according to a quantization step size of each macro-block. The quantization step size is included in the additional information 104 decoded in the variable-length decoding unit 1 shown in FIG. 2. 42 indicates an error macro-block judging unit for judging each coded macro-block to be or not to be an error macro-block according to the adjacent-block continuity 127 and the pixel average difference 133.

In FIG. 12, the lateral directional difference calculating unit 21, the longitudinal directional difference calculating unit 22, the lateral directional continuity judging unit 23, the longitudinal directional continuity judging unit 24, the block continuity judging unit 25, the inner-block pixel average value calculating unit 31 and the pixel average difference calculating unit 32 are the same as those in the first and third embodiments.

Next, an operation will be described.

Figure 13:
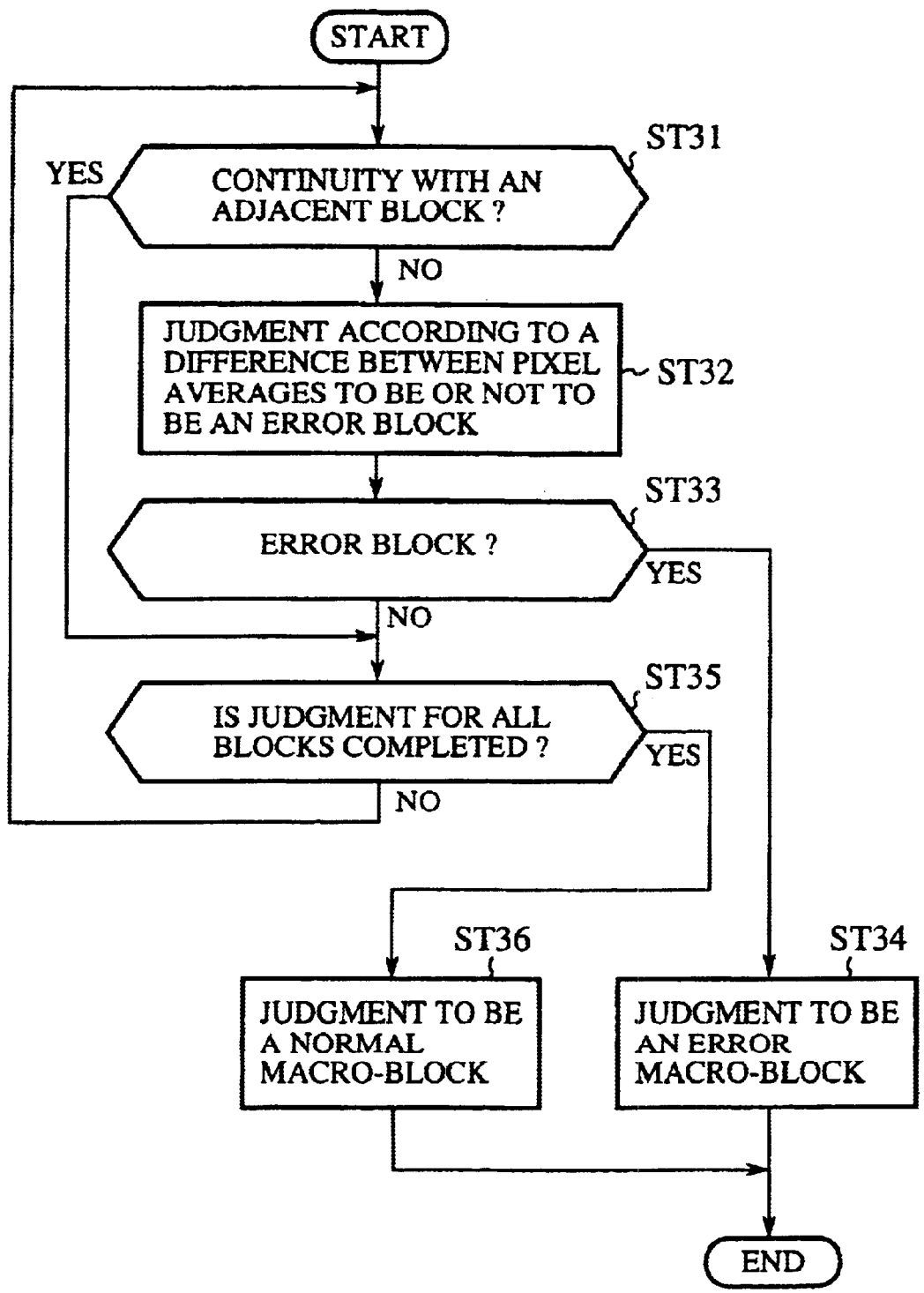
FIG. 13 is a flow chart showing an operation of the error macro-block detecting unit according to the fifth embodiment of the present invention.

An operation of the threshold value control unit 41 is the same as that in the second and fourth embodiments. FIG. 13 is a flow chart showing an operation of the error macro-block detecting unit 42 according to the fifth embodiment.

In the error macro-block detecting unit 42, each decoded macro-block is judged to be or not to be an error macro-block according to the adjacent-block continuity 127 and the pixel average difference 133. In a step ST 31, the continuity of one decoded block with each of adjacent blocks adjacent to the decoded block is judged in the error macro-block detecting unit 42 according to the adjacent-block continuity 127. This continuity judgment is performed for the color difference blocks and the luminance blocks in that order.

As a result of the judgment in the step ST31, in cases where the decoded block is continuous with one adjacent block, in a step ST35, it is examined in the error macro-block detecting unit 42 whether or not the error judgment is performed for all decoded blocks. In cases where the error judgment is not performed for all decoded blocks, the procedure returns to the step ST31, and the continuity of another decoded block with each adjacent block is examined.

In contrast, as a result of the judgment in the step ST31, in cases where the decoded block is discontinuous with all adjacent blocks, in a step ST32, as is described in the third embodiment, the error macro-block detecting unit 42 judges the decoded block to be or not to be an error block according to the pixel average difference 133.

In a step ST33, in cases where it is judged that the decoded block is to be an error block, in a step ST34, the error macro-block detecting unit 42 judges one macro-block including the decoded block to be an error macro-block and outputs an error macro-block judging result 111 to the change-over unit 9 shown in FIG. 2. In contrast, in the step ST33, in cases where it is judged that the decoded block is not to be an error block, in the step ST35, this judgment of the step ST33 is performed for all decoded blocks of the corresponding macro-block. In cases where it is judged in the steps ST33 and ST35 that each of all the decoded blocks is not to be an error block, in a step ST36, the error macro-block detecting unit 42 judges the macro-block including the decoded blocks to be a normal macro-block and outputs an error macro-block judging result 111 to the change-over unit 9.

That is, in cases where it is judged in the step ST31 that each of all decoded blocks included in the corresponding macro-block is continuous with one adjacent block or in cases where it is judged, in the step ST33, according to the pixel average difference that each of the decoded blocks is not an error block, the macro-block including the decoded blocks is judged, in the step ST36, to be a normal macro-block. However, it is applicable that one macro-block be judged in the step ST36 to be a normal macro-block in cases where it is judged in the step ST31 that each of all decoded blocks of the macro-block is continuous with one adjacent block and in cases where it is judged, in the step ST33, according to the pixel average difference that each of all decoded blocks of the macro-block is not an error block.

In this embodiment, the threshold value control unit 41 controls the prescribed threshold value 141 and the prescribed threshold value 142 according to the quantization step size of each macro-block. However, it is applicable that no control according to the quantization step size is performed for the prescribed threshold value in the same manner as in the first and third embodiments.

As is described above, in the fifth embodiment, because the macro-block is judged to be or not to be an error macro-block according to the plurality of judging methods, the macro-block, in which an error occurs, can be more reliably judged to be an error macro-block, so that an erroneous judgment can be avoided.

Also, the judgement is hierarchically performed from the judging processing for the color difference blocks to the judging processing for the luminance blocks, in cases where one decoded block is judged to be an error block, the macro-block including the decoded block is judged to be an error macro-block, and the judging processing for the remaining decoded blocks is not performed. Therefore, a calculation volume required for the judging processing can be reduced.

Embodiment 6

In the first to fifth embodiments, the image decoding apparatus operated for the image decoded according to the coding method of the MPEG-4 in the moving picture is described. However, the image decoding apparatus of the present invention can be applicable for a still picture. Also, the coding method, in which the DCT and the quantization are performed for each block, is described. However, the image decoding apparatus of the present invention is not limited to the coding method. That is, the image decoding apparatus of the present invention is applicable for all coding methods in which the coding such as an orthogonal transformation other than DCT is performed for each block.

In addition, the continuity of one block with each neighboring block is examined for each block composed of 8*8 pixels. However, the present invention is not limited to this block unit of the 8*8 pixel size. For example, it is applicable that the continuity of one macro-block with each neighboring macro-block be examined for each macro-block composed of 16*16 pixels.

In addition, the present invention is not limited to the block or macro-block having a fixed shape, in cases where an image is coded for each region having an arbitrary shape, the continuity of one region with each neighboring region is examined for each region. Therefore, the present invention is applicable for all coding methods in which the coding is performed for each region having an arbitrary shape.

Embodiment 7

A block diagram showing the configuration of an image decoding apparatus according to a third embodiment of the present invention is the same as that shown in FIG. 2 according to the first embodiment. In the first to sixth embodiments, the macro-block, in which a bit error occurs, is detected by using the continuity of the image signal in a spatial direction. In this embodiment, a macro-block, in which a bit error occurs, is detected by using the correlation of the image signal in a time direction.

In the image coding, in cases where a motion of the image is slow, an inter-frame prediction coding, in which the correlation existing between frames is used, is performed. In a motion compensating prediction known as a representative inter-frame prediction coding method, each frame is divided into a plurality of blocks respectively having a predetermined image size, a block, in which a difference signal becomes the smallest in a predetermined region, is found out from a past frame, a shift from a position of the found-out block to a position of the to-be-coded block is set as a motion vector, this motion vector and the difference signal (that is, a prediction error signal) are coded and are multiplexed with a coded bit stream.

In cases where a block similar to the to-be-coded block exists in the past frame, because a variance of the prediction error signal is made small, the to-be-coded block can be efficiently coded. In contrast, in cases where a block similar to the to-be-coded block does not exist in the past frame, because a variance of the prediction error signal is made large, the coding of the to-be-coded block is performed by using only information of a current frame (intra-coding). On a side of the decoding apparatus, as is described in the first embodiment, the motion vector 103 and the prediction error signal 109 demultiplexed from the coded bit stream 101 are decoded, the predicted image 107 is taken out according to the decoded motion vector 103, and the predicted image 107 is added to the decoded prediction error signal 109 to reproduce the decoded image signal 110.

In this embodiment, because the intra-coding is selected on a side of the coding apparatus in cases where a variance of the decoded prediction error signal 109 becomes large, the selection of the intra-coding is utilized in this embodiment. That is, a threshold value processing is performed for a variance of the decoded prediction error signal 109 on the decoding apparatus side, so that a macro-block, in which a bit error occurs, is detected.

Figure 14:
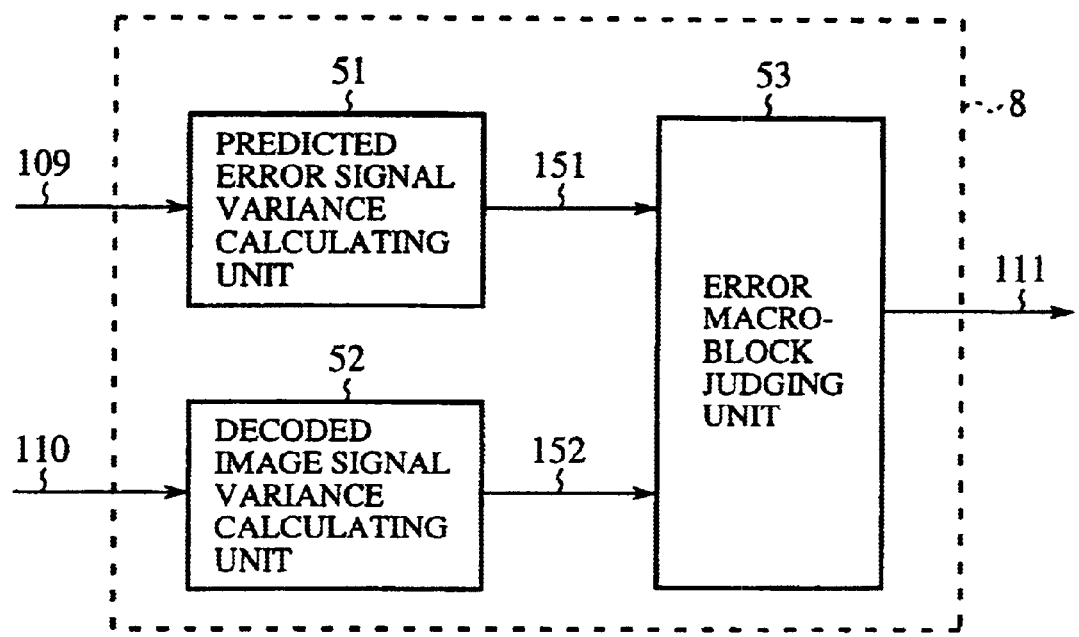
FIG. 14 is a block diagram showing an internal configuration of an error macro-block detecting unit according to a seventh embodiment of the present invention.

FIG. 14 is a block diagram showing an internal configuration of the error macro-block detecting unit (that is, the error partial image region detecting means) 8 according to the seventh embodiment. In FIG. 14, 51 indicates a predicted error signal variance calculating unit for calculating a variance of the decoded prediction error signal 109 and outputting a prediction error signal variance 151. 52 indicates a decoded image signal variance calculating unit for calculating a variance of the decoded image signal 110 and outputting a decoded image signal variance 152. 53 indicates an error macro-block judging unit for judging each macro-block to be or not to be an error macro-block according to the prediction error signal variance 151 and the decoded image signal variance 152 and outputting an error macro-block judging result 111.

Next, an operation will be described.

Figure 15:
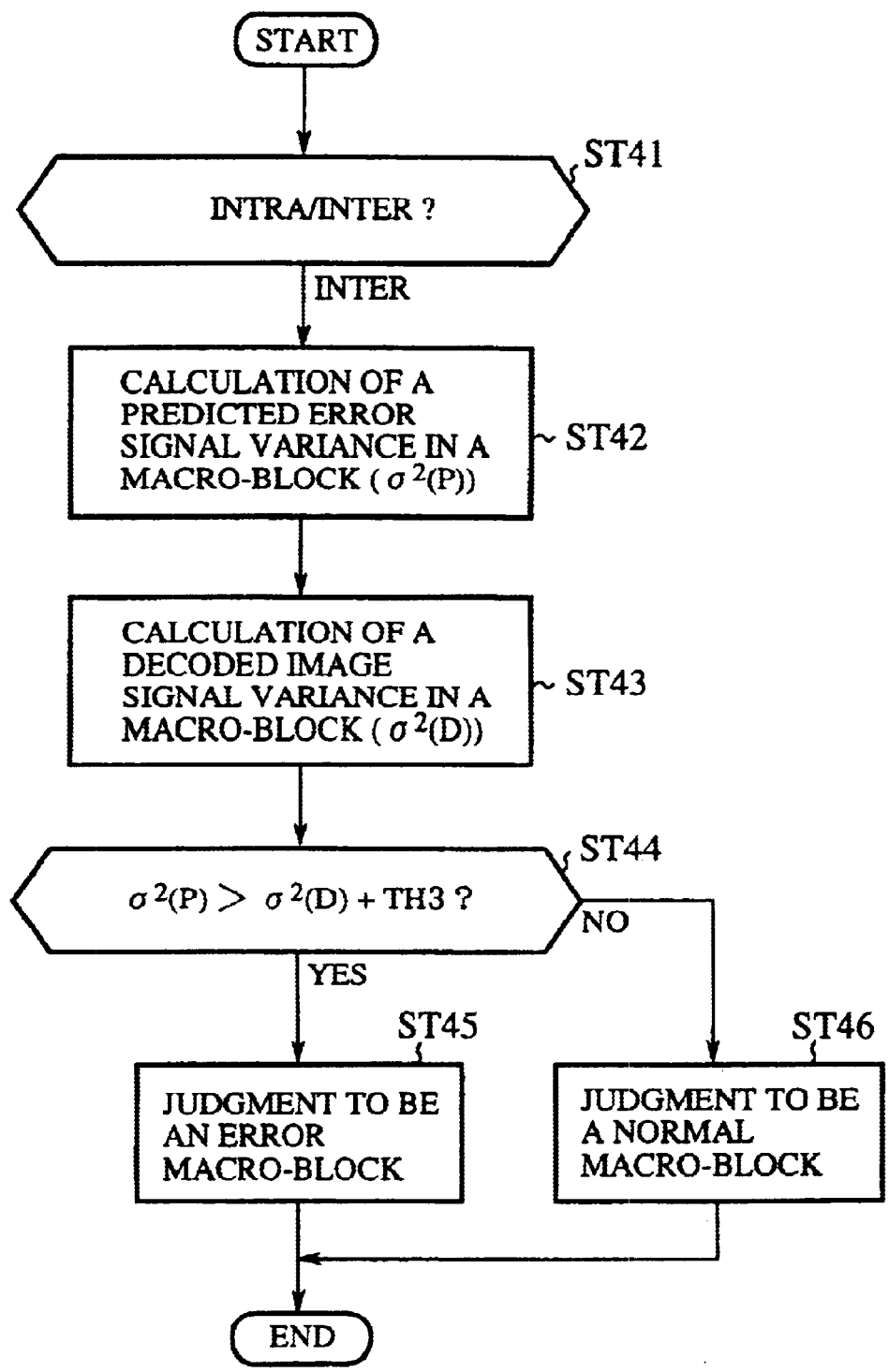
FIG. 15 is a flow chart showing an operation of the error macro-block detecting unit according to the seventh embodiment of the present invention.

FIG. 15 is a flow chart showing an operation of the error macro-block detecting unit 8. The error macro-block detecting unit 8 in this embodiment is not applied for an intra-macro-block but is applied only for an inter-macro-block.

In a step ST41, it is judged according to the additional information 104 decoded in the variable-length decoding unit 1 of FIG. 2 whether each macro-block is an inter-macro-block or an intra-macro-block. In case of the intra-macro-block, one of the judging methods in the first to fifth embodiments can be used. In case of the inter-macro-block, the judgment to be or not to be an error macro-block is performed according to a following procedure.

In a step ST42, in the predicted error signal variance calculating unit 51, a variance of the decoded prediction error signal 109 is calculated according to an equation (10), and a prediction error signal variance 151 is output. Here, $\sigma^2(P)$ denotes a prediction error signal variance, $P_{i,j}$ denotes a value of a pixel placed at a row i and a column j of a predicted error block having an N*N pixel size, and $m_P$ denotes an average of pixel values of the predicted error block having the N*N pixel size.

$$\sigma^2(P) = (1/N^2) \sum_{i,j=1}^{N} (P_{i,j} - m_P)^2, \quad (10)$$

$$m_P = (1/N^2) \sum_{i,j=1}^{N} p_{i,j}$$

In a step ST43, in the decoded image signal variance calculating unit 52, a variance of the decoded image signal 110 is calculated according to an equation (11), and a decoded image signal variance 152 is output. Here, $\sigma^2(D)$ denotes a decoded image signal variance, $d_{i,j}$ denotes a value of a pixel placed at a row i and a column j of a decoded block having an N*N pixel size, and md denotes an average of pixel values of the decoded block having the N*N pixel size.

$$\sigma^2(D) = (1/N^2) \sum_{i,j=1}^{N} (d_{i,j} - m_d)^2, \quad (11)$$

$$m_d = (1/N^2) \sum_{i,j=1}^{N} d_{i,j}$$

In a step ST44, in the error macro-block judging unit 53, a comparison is performed according to an equation (12) by using the prediction error signal variance 151 calculated in the predicted error signal variance calculating unit 51, the decoded image signal variance 152 calculated in the decoded image signal variance calculating unit 52 and a prescribed threshold value TH3.

$$\sigma^2(P) > \sigma^2(D) + TH3 \qquad (12)$$

In the step ST44, in cases where the prediction error signal variance $\sigma^2(P)$ is larger than a sum of the decoded image signal variance.

$\sigma^2(D)$ and the prescribed threshold value TH3, in a step ST45, the error macro-block judging unit 53 judges the macro-block to be an error macro-block.

In contrast, in the step ST44, in cases where the prediction error signal variance $\sigma^2(P)$ is not larger than a sum of the decoded image signal variance $\sigma^2(D)$ and the prescribed threshold value TH3, in a step ST46, the error macro-block judging unit 53 judges the macro-block to be a normal macro-block.

In this embodiment, the prediction error signal variance $\sigma^2(P)$ and the decoded image signal variance $\sigma^2(D)$ are used as representative values of the decoded prediction error signal 109 and the decoded image signal 110. However, it is applicable that an average or a sum of squares be used as a representative value. Also, the judgment to be or not to be an error macro-block can be performed by combining the method described in this embodiment and one of the methods described in the first to fifth embodiments.

As is described above, in the seventh embodiment, the prediction error signal variance 151 and the decoded image signal variance 152 are compared with each other, so that the detection of an error macro-block can be performed by using the correlation of the image signal in the time direction. Therefore, an error can be detected in an early stage, and an error propagation or the degradation of an image quality caused by the error can be suppressed to the minimum degree.

Embodiment 8

In an eighth embodiment of the present invention, a coded bit stream is received from a transmission line or a recording medium, the decoding and display of an image are performed in an image decoding apparatus, an occurrence frequency of a bit error is detected, in cases where it is judged that the occurrence frequency is high, an operation of the error macro-block detecting unit is started. Therefore, an erroneous operation of the error macro-block detecting unit is reduced, and the degradation of an image quality caused by a decoded error is stably suppressed.

In the above-described error macro-block detecting unit, because an error is assumed and detected according to stationary properties of an image signal before the decoding of the image signal becomes impossible in process of a syntax analysis or before a fatal error for image data such as the decoding of unrighteous data is detected, there is a possibility that an erroneous detection is performed. Therefore, in this embodiment, only in case of the receiving conditions, in which the bit error frequently occurs, an operation of the error macro-block detecting unit is started, the tolerance to the error is heightened, so that a decoding operation stable as a whole is performed.

Figure 16:
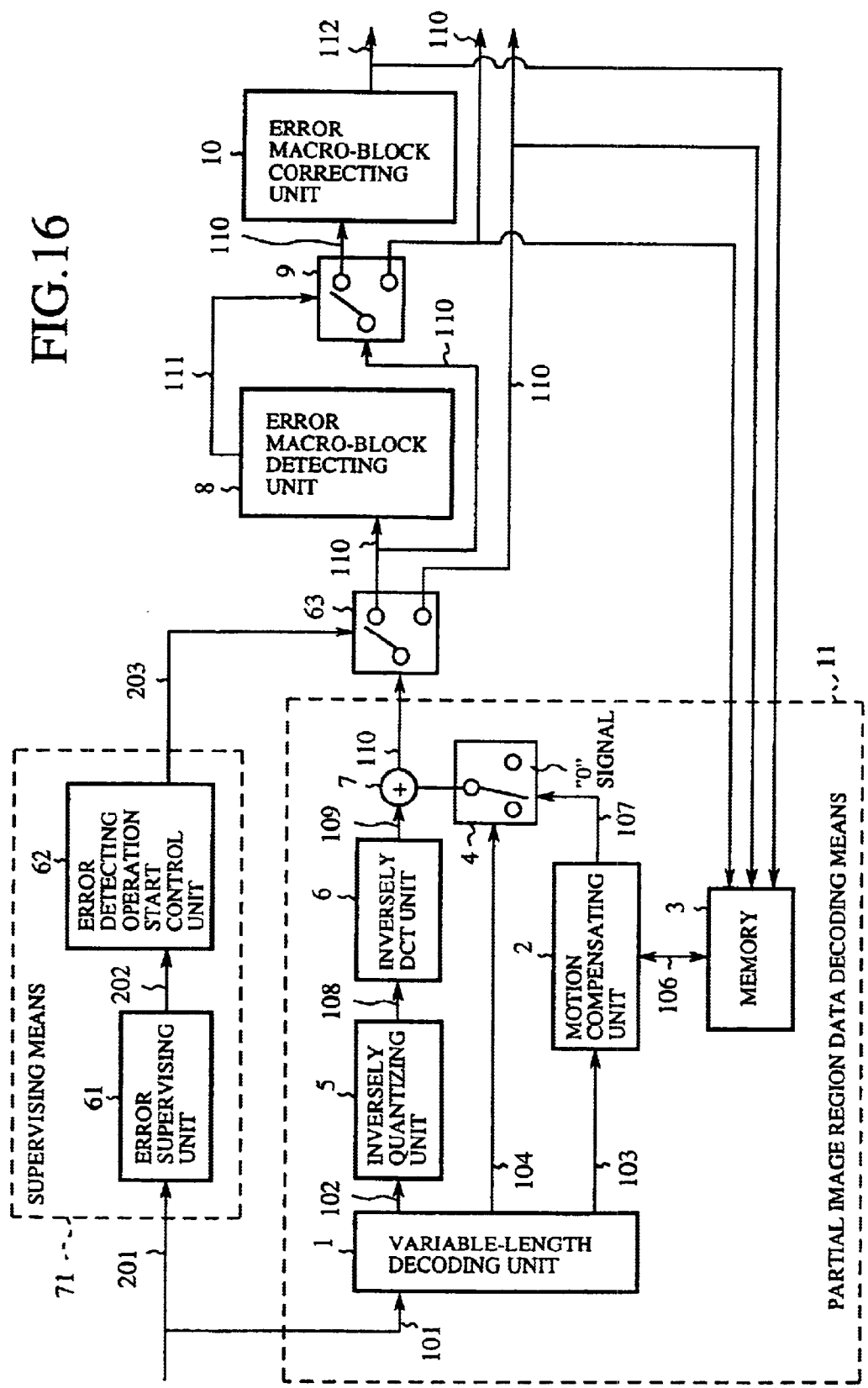
FIG. 16 is a block diagram showing the configuration of an image decoding apparatus according to an eighth embodiment of the present invention.

FIG. 16 is a block diagram showing the configuration of an image decoding apparatus according to an eighth embodiment. In FIG. 16, 61 indicates an error supervising unit for receiving a string of media packets 201 and outputting a bit error count value 202. 62 indicates an error detecting operation start control unit for receiving the bit error count value 202 and outputting an error detection start instruction flag 203 to control an operation start of the error macro-block detecting unit 8. 63 indicates a change-over unit for transmitting the decoded image signal 110 received from the adding unit 7 to the error macro-block detecting unit 8 according to the error detection start instruction flag 203. 71 indicates a supervising means composed of the error supervising unit 61 and the error detecting operation start control unit 62. The other configuration is equivalent to that of FIG. 2 according to the first embodiment.

Figure 17:
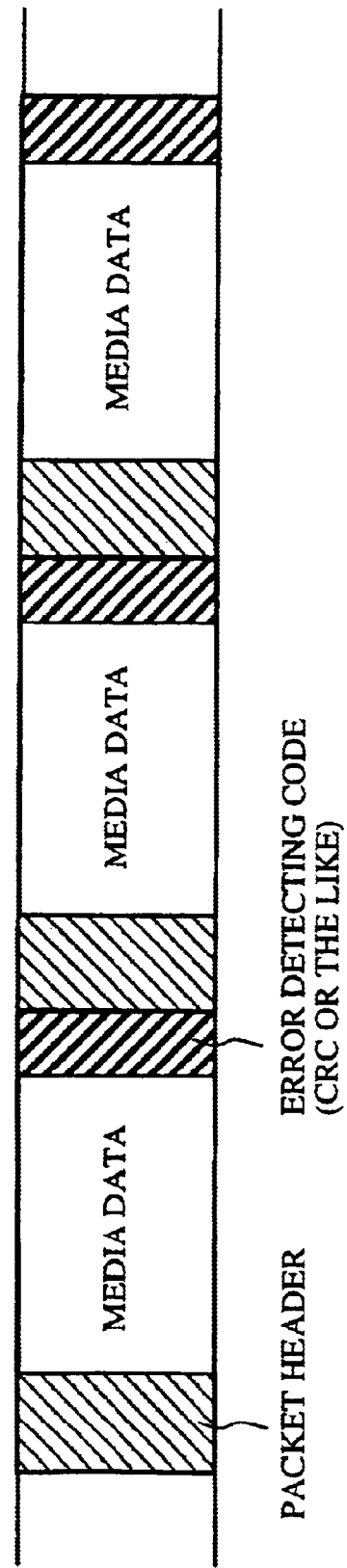
FIG. 17 is a diagram showing the configuration of a media packet string.

FIG. 17 is a diagram showing the configuration of the string of media packets 201. The media packet is defined as a digital data unit. In the media packet, video data, audio data which is planned to be decoded and presented in synchronization with the video data and various media such as text, graphics and still pictures are packed at a format which is standardized according to prescribed rules. For example, MPEG-2 (ISO/IEC 13818-1) packetized elementary stream (PES), ITU-T H.223 AL-PDU or the like are known as the media packet.

In FIG. 17, a packet header of each media packet denotes various pieces of header information describing a packet attribute, a media type and the like, a piece of media data of each media packet denotes peculiar coded data such as video data, audio data or the like, and an error detecting code added to of each media packet denotes an added bit used to perform an error detection such as a cyclic redundancy check (CRC) or the like. The string of media packets 201 formed at a standardized media packet type shown in FIG. 17 is transmitted, and only the image coded data (that is, the coded bit stream 101 ) included in the string of media packets 201 is fed to the variable-length decoding unit 1 shown in FIG. 16.

Next, an operation is described.

The operations performed in the partial image region data decoding means 11, the error macro-block detecting unit 8 and the units following the error macro-block detecting unit 8 are the same as those performed according to the first embodiment. In the error supervising unit 61, the string of media packets 201 is received, a bit error occurrence frequency is supervised by using the error detecting code attached to each piece of media data, the number of detected bit errors is counted, and a bit error count value 202 is output.

In the error detecting operation start control unit 62, the bit error count value 202 denoting an error detecting result obtained in the error supervising unit 61 is checked at prescribed unit-time intervals. In cases where the bit error count value 202 checked at the prescribed unit-time intervals exceeds a prescribed threshold value, it is judged that the receiving conditions deteriorate (for example, a bit error rate in the transmission line is large, the reading-out from a recording medium is unstable, or the like), so that an error detection start instruction flag 203 is output. In contrast, in cases where the bit error count value 202 at the prescribed unit-time intervals does not exceed a prescribed threshold value, it is judged that the receiving conditions are good, so that no error detection start instruction flag 203 is output.

In the change-over unit 63, in cases where the error detection start instruction flag 203 is received from the error detecting operation start control unit 62, the decoded image signal 110 received from the adding unit 7 is input to the error macro-block detecting unit 8 to make the error macro-block detecting unit 8 start an operation. In contrast, in cases where no error detection start instruction flag 203 is received from the error detecting operation start control unit 62, the change-over unit 63 does not make the error macro-block detecting unit 8 start an operation, but the decoded image signal 110 received from the adding unit 7 is output.

In the error macro-block detecting unit 8, a macro-block, in which an error occurs, is detected in the configuration according to the one of the first to seventh embodiments, and a correcting processing is performed for a lost image region in the error macro-block correcting unit 10.

Figure 18:
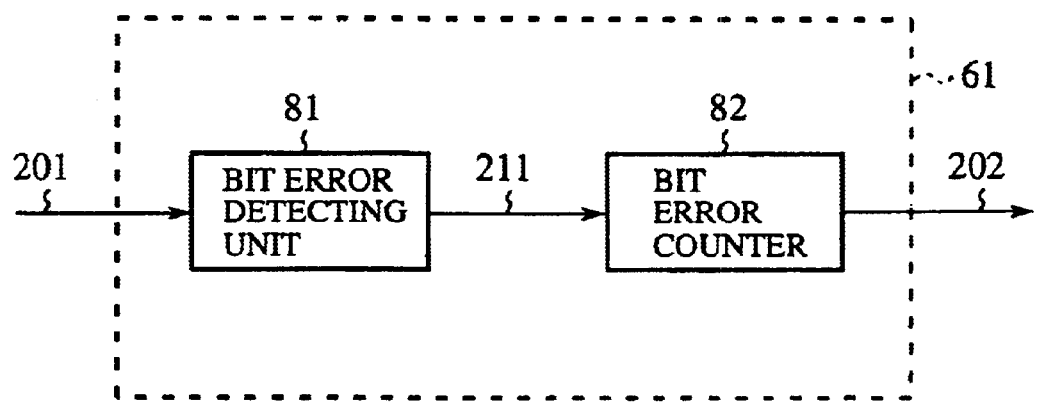
FIG. 18 is a block diagram showing the configuration of an error supervising unit according to the eighth embodiment of the present invention.

FIG. 18 is a block diagram showing the configuration of the error supervising unit 61. In a bit error detecting unit 81, the string of media packets 201 is received, one or more bit errors occurring in each media packet are detected by using the error detecting code added to the string of media packets 201 for each packet, and a bit error count value 211 is output for each packet. In a bit error counter 82, the bit error count value 211 received from the bit error detecting unit 81 for each packet is summed up for each media packet, and a summed-up bit error count value 202 is output to the error detecting operation start control unit 62 for each media packet. As is described above, in the error supervising unit 61, the change of each summed-up bit error count value 202 is supervised, so that the bit error occurrence frequency in the string of media packets 201, which is in the middle of the transmission through the transmission line, or the bit error occurrence frequency in the string of media packets 201, which is in the middle of the reading-out from a recording medium, is supervised.

As one supervising method performed in the error supervising unit 61, the present invention is not limited to the method based on the error detecting code described above, and it is applicable that a received electric field strength of a radio wave carrying a string of media packets or phase information obtained after a delay-detection of the radio wave be supervised. Also, it is applicable that a bit error state in other media packets such as audio data be supervised to supervise the bit error occurrence frequency by additionally considering a supervised result of the bit error state.

The control in the error detecting operation start control unit 62 is not limited to an on-off control described above, various control methods are applicable. For example, though the threshold value is controlled according to the quantization step size of the macro-block included in the additional information 104 in the first and fourth embodiments, it is applicable that the threshold value be controlled according to each summed-up bit error count value 202 received from the error supervising unit 61.

That is, in cases where the summed-up bit error count value 202 is high, the receiving conditions deteriorate to heighten a probability that an error occurs. Therefore, the threshold value is set to a low value. In contrast, in cases where the summed-up bit error count value 202 is low, the receiving conditions are stable to lower a probability that an error occurs. Therefore, the threshold value is set to a high value. Therefore, because the threshold value is set according to the output result of the error supervising unit 61, the processing of the error macro-block detecting unit 8 is controlled, in cases where the receiving conditions are good, the erroneous detection in the error macro-block detecting unit 8 can be avoided.

As another control method performed in the error detecting operation start control unit 62, an estimation range of the continuity can be changed. In the first embodiment, the judgment of the continuity is performed for each of the color difference blocks and the luminance blocks respectively having the 8*8 pixel size, in cases where the judgment of the discontinuity is performed for at least one block included in one macro-block, it is judged that the macro-block including the block is an error macro-block. However, in cases where it is judged according to the output result of the error supervising unit 61 that the receiving conditions are stable, because the probability that an error occurs is low, to make strict the detecting condition of the error macro-block, in case of the luminance blocks, it is applicable that the judgment of the discontinuity is performed for each macro-block of 16*16 pixel size. Also, it is applicable that the number of to-be-estimated pixels for the inter-pixel difference be increased.

As is described above, in the eighth embodiment, because the error macro-block detecting unit 8 is adaptively operated according to the reliability of the transmission quality of the transmission line or the reliability of the reading-out from the recording medium, in cases where the receiving conditions are good, the erroneous detection performed in the error macro-block detecting unit 8 can be avoided, and a decoding operation stable as a whole can be performed.

What is claimed is:

1. An image decoding apparatus, in which a coded bit stream produced by compressing and coding an input image signal for each partial image region is decoded, comprising:
   partial image region data decoding means for decoding the coded bit stream for each partial image region; and
   error partial image region detecting means for calculating a first pixel level change degree between pixels adjacent to each other through a boundary between a decoded partial image region decoded by the partial image region data decoding means and a partial image region adjacent to the decoded partial image region, calculating a second pixel level change degree between pixels of the partial image region adjacent to the decoded partial image region, and detecting according to the first pixel level change degree, the second pixel level change degree and a prescribed threshold value relating to the first pixel level change degree and the second pixel level change degree that the decoded partial image region is an error partial image region in which an influence of a bit error occurring in the coded bit stream is received.

2. An image decoding apparatus according to claim 1, wherein the error partial image region detecting means calculates a first pixel level difference value between pixels adjacent to each other through the boundary between the decoded partial image region and the partial image region adjacent to the decoded partial image region, calculates a second pixel level difference value between pixels of the partial image region adjacent to the decoded partial image region, calculates a third pixel level difference value between pixels of the partial image region adjacent to the decoded partial image region, and detects according to a difference value between the first pixel level difference value and the second pixel level difference value, a difference value between the second pixel level difference value and the third pixel level difference value and the prescribed threshold value that the decoded partial image region is the error partial image region in which the influence of the bit error occurring in the coded bit stream is received.

3. An image decoding apparatus according to claim 1, wherein the error partial image region detecting means comprises threshold value control means for controlling the prescribed threshold value used for the detection of the error partial image region according to a quantization step size decoded from the coded bit stream.

4. An image decoding apparatus, in which a coded bit stream produced by compressing and coding an input image signal for each partial image region is decoded, comprising:
   partial image region data decoding means for decoding the coded bit stream for each partial image region; and
   error partial image region detecting means for calculating a representative value of a plurality of first pixel levels in a decoded partial image region decoded by the partial image region data decoding means, calculating a representative value of a plurality of second pixel levels in a partial image region placed in the neighborhood of the decoded partial image region, and detecting according to the representative value of the first pixel levels, the representative value of the second pixel levels and a prescribed threshold value relating to the representative value of the first pixel levels and the representative value of the second pixel levels that the decoded partial image region is an error partial image region in which an influence of a bit error occurring in the coded bit stream is received.

5. An image decoding apparatus according to claim 4, wherein the error partial image region detecting means calculates an average of the first pixel levels as the representative value of the first pixel levels, calculates a plurality of averages of a plurality of groups of second pixel levels as a plurality of representative values of the plurality of groups of second pixel levels in a plurality of partial image regions placed in the neighborhood of the decoded partial image region, and detects the error partial image region according to a difference between the average of the first pixel levels and the average of each group of second pixel levels and a prescribed threshold value relating to the differences.

6. An image decoding apparatus according to claim 5, wherein the error partial image region detecting means weights the difference between the average of the first pixel levels and the average of each group of second pixel levels according to a correlation between the decoded partial image region and the corresponding partial image region placed in the neighborhood of the decoded partial image region.

7. An image decoding apparatus according to claim 4, wherein the error partial image region detecting means comprises threshold value control means for controlling the prescribed threshold value used for the detection of the error partial image region according to a quantization step size decoded from the coded bit stream.

8. An image decoding apparatus, in which a coded bit stream produced by compressing and coding an input image signal for each partial image region is decoded, comprising:

partial image region data decoding means for decoding the coded bit stream for each partial image region; and error partial image region detecting means for calculating a first pixel level change degree between pixels adjacent to each other through a boundary between a decoded partial image region decoded by the partial image region data decoding means and a partial image region adjacent to the decoded partial image region, calculating a second pixel level change degree between pixels of the partial image region adjacent to the decoded partial image region, judging continuity between the decoded partial image region and the partial image region adjacent to the decoded partial image region according to the first pixel level change degree, the second pixel level change degree and a first prescribed threshold value relating to the first pixel level change degree and the second pixel level change degree, calculating a representative value of a plurality of first pixel levels in the decoded partial image region, calculating a representative value of a plurality of second pixel levels in the partial image region placed in the neighborhood of the decoded partial image region, and detecting according to the judgment of the continuity between the decoded partial image region and the partial image region adjacent to the decoded partial image region, there presentative value of the first pixel levels, the representative value of the second pixel levels and a second prescribed threshold value relating to the representative value of the first pixel levels and the representative value of the second pixel levels that the decoded partial image region is an error partial image region in which an influence of a bit error occurring in the coded bit stream is received.

9. An image decoding apparatus according to claim 8, wherein the error partial image region detecting means comprises threshold value control means for controlling the first prescribed threshold value and the second prescribed threshold value used for the detection of the error partial image region according to a quantization step size decoded from the coded bit stream.

10. An image decoding apparatus, in which a coded bit stream produced by compressing and coding an input image signal for each partial image region is decoded, comprising:

partial image region data decoding means for decoding the coded bit stream for each partial image region; and error partial image region detecting means for detecting according to a comparison between a decoded image signal decoded by the partial image region data decoding means and a predicted error signal that the decoded partial image region is an error partial image region in which an influence of a bit error occurring in the coded bit stream is received.

11. An image decoding apparatus according to claim 10, wherein the error partial image region detecting means calculates a representative value of the decoded image signal and a representative value of the predicted error signal and detects according to the representative value of the decoded image signal, the representative value of the predicted error signal and a prescribed threshold value relating to the representative value of the decoded image signal and the representative value of the predicted error signal that the decoded partial image region is the error partial image region.

12. An image decoding apparatus, in which a media packet string including a coded bit stream produced by compressing and coding an input image signal for each partial image region is received and the coded bit stream is decoded, comprising:

partial image region data decoding means for decoding the coded bit stream for each partial image region;

error partial image region detecting means for detecting according to a comparison between an image signal characteristic at a decoded partial image region decoded by the partial image region data decoding means and an image signal characteristic at one partial image region placed in the neighborhood of the decoded partial image region that the decoded partial image region is an error partial image region in which an influence of a bit error occurring in the coded bit stream is received, for each partial image region; and supervising means for supervising a bit error occurrence frequency in the reception of the media packet string according to an error detecting code included in the media packet string, wherein the error partial image region detecting means is controlled according to a supervising result of the supervising means.

13. An image decoding apparatus according to claim 12, wherein the error partial image region detecting means controls, according to the supervising result of the supervising means, a comparison condition used in the comparison between the image signal characteristic at the decoded partial image region and the image signal characteristic at the partial image region placed in the neighborhood of the decoded partial image region.

14. An image decoding apparatus according to claim 12, wherein the error partial image region detecting means controls, according to the supervising result of the supervising means, a size of each partial image region in the detection of the error partial image region.

* * * * *